United States Patent
Thomas et al.

(10) Patent No.: US 11,951,935 B2
(45) Date of Patent: Apr. 9, 2024

(54) SYSTEM AND METHOD FOR ASSESSING SEATBELT ROUTING USING SEATBELT ROUTING ZONES THAT ARE BASED ON SIZE AND SHAPE OF OCCUPANT

(71) Applicant: GM GLOBAL TECHNOLOGY OPERATIONS LLC, Detroit, MI (US)

(72) Inventors: Scott D. Thomas, Novi, MI (US); Dorel M. Sala, Troy, MI (US); Joseph Philip McLaine, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 383 days.

(21) Appl. No.: 17/383,034

(22) Filed: Jul. 22, 2021

(65) Prior Publication Data

US 2023/0026640 A1    Jan. 26, 2023

(51) Int. Cl.
| | |
|---|---|
| *B60R 22/48* | (2006.01) |
| *B60R 11/04* | (2006.01) |
| *G06K 9/00* | (2022.01) |
| *G06V 20/59* | (2022.01) |
| *B60R 11/00* | (2006.01) |

(52) U.S. Cl.
CPC .............. *B60R 22/48* (2013.01); *B60R 11/04* (2013.01); *G06V 20/593* (2022.01); *B60R 2011/0003* (2013.01); *B60R 2022/4808* (2013.01)

(58) Field of Classification Search
CPC . B60R 22/48; B60R 11/04; B60R 2011/0003; B60R 2022/4808; G06V 20/593
USPC .......................................................... 701/45
See application file for complete search history.

(56) References Cited

U.S. PATENT DOCUMENTS

| | | | | |
|---|---|---|---|---|
| 3,586,373 | A * | 6/1971 | Reidelbach | B60R 22/26 297/483 |
| 6,439,333 | B2 * | 8/2002 | Domens | B60R 21/01532 180/268 |
| 7,243,945 | B2 * | 7/2007 | Breed | B60R 21/015 180/274 |
| 7,817,056 | B2 * | 10/2010 | Hetzenecker | B60R 21/01516 701/45 |
| 9,738,252 | B1 * | 8/2017 | Shoda | B60P 1/04 |
| 9,878,689 | B1 * | 1/2018 | Jimenez | B60R 21/01544 |

(Continued)

FOREIGN PATENT DOCUMENTS

| | | |
|---|---|---|
| DE | 102020127221 A1 | 5/2021 |
| EP | 2987688 A1 | 2/2016 |

OTHER PUBLICATIONS

U.S. Appl. No. 16/871,252, Thomas et al.
Office Action dated Jun. 19, 2023 from German Patent Office for German Patent Application No. 102022109369.7; 5 pages.

*Primary Examiner* — Logan M Kraft
*Assistant Examiner* — John D Bailey

(57) ABSTRACT

A system includes an in-cabin sensor, a seatbelt routing zone module, and a seatbelt routing classification module. The in-cabin sensor is operable to generate an image of an occupant in a vehicle seat. The seatbelt routing zone module is configured to generate a seatbelt routing zone based on at least one of a size of the occupant in the image and a shape of the occupant. The seatbelt routing classification module is configured to determine whether a seatbelt is routed properly around the occupant based on whether the seatbelt is at least partially within the seatbelt routing zone.

20 Claims, 13 Drawing Sheets

(56) References Cited

U.S. PATENT DOCUMENTS

| | | | |
|---|---|---|---|
| 10,005,425 B2* | 6/2018 | Becker | B60R 22/48 |
| 10,953,850 B1* | 3/2021 | Pertsel | B60R 21/01538 |
| 11,046,273 B2* | 6/2021 | Baltaxe | G06F 18/24 |
| 11,117,546 B2* | 9/2021 | Cuddihy | B60R 22/48 |
| 11,491,940 B2* | 11/2022 | Thomas | B60R 21/01538 |
| 2005/0263992 A1* | 12/2005 | Matsuda | G06V 20/593 |
| | | | 280/735 |
| 2007/0195990 A1* | 8/2007 | Levy | G06V 10/225 |
| | | | 340/457.1 |
| 2008/0059027 A1* | 3/2008 | Farmer | B60R 21/01538 |
| | | | 701/45 |
| 2008/0164682 A1* | 7/2008 | Matsuda | G01S 5/163 |
| | | | 280/735 |
| 2011/0295466 A1* | 12/2011 | Ostu | B60R 21/01534 |
| | | | 374/45 |
| 2016/0046261 A1* | 2/2016 | Gulash | G06T 17/20 |
| | | | 701/45 |
| 2016/0078306 A1* | 3/2016 | Artan | B60N 2/002 |
| | | | 382/104 |
| 2018/0101741 A1* | 4/2018 | Arai | G06V 20/593 |
| 2019/0152418 A1* | 5/2019 | Coughlin | B60K 28/02 |
| 2019/0193676 A1* | 6/2019 | Thomas | B60R 22/18 |
| 2019/0258263 A1* | 8/2019 | Wendel | B60W 50/14 |
| 2019/0375360 A1* | 12/2019 | Hiroki | B60R 21/01534 |
| 2020/0172048 A1* | 6/2020 | Jo | B60R 22/48 |
| 2020/0231109 A1* | 7/2020 | Baltaxe | G06N 3/08 |
| 2020/0320318 A1* | 10/2020 | Ramaglia | G06V 20/59 |
| 2020/0398778 A1* | 12/2020 | Baltaxe | B60R 21/01552 |
| 2021/0114541 A1* | 4/2021 | Hosokawa | G06V 40/103 |
| 2021/0138999 A1* | 5/2021 | Thomas | G06V 20/59 |
| 2021/0206344 A1* | 7/2021 | George | B60R 21/01534 |
| 2022/0203930 A1* | 6/2022 | Hu | G06T 7/60 |

\* cited by examiner

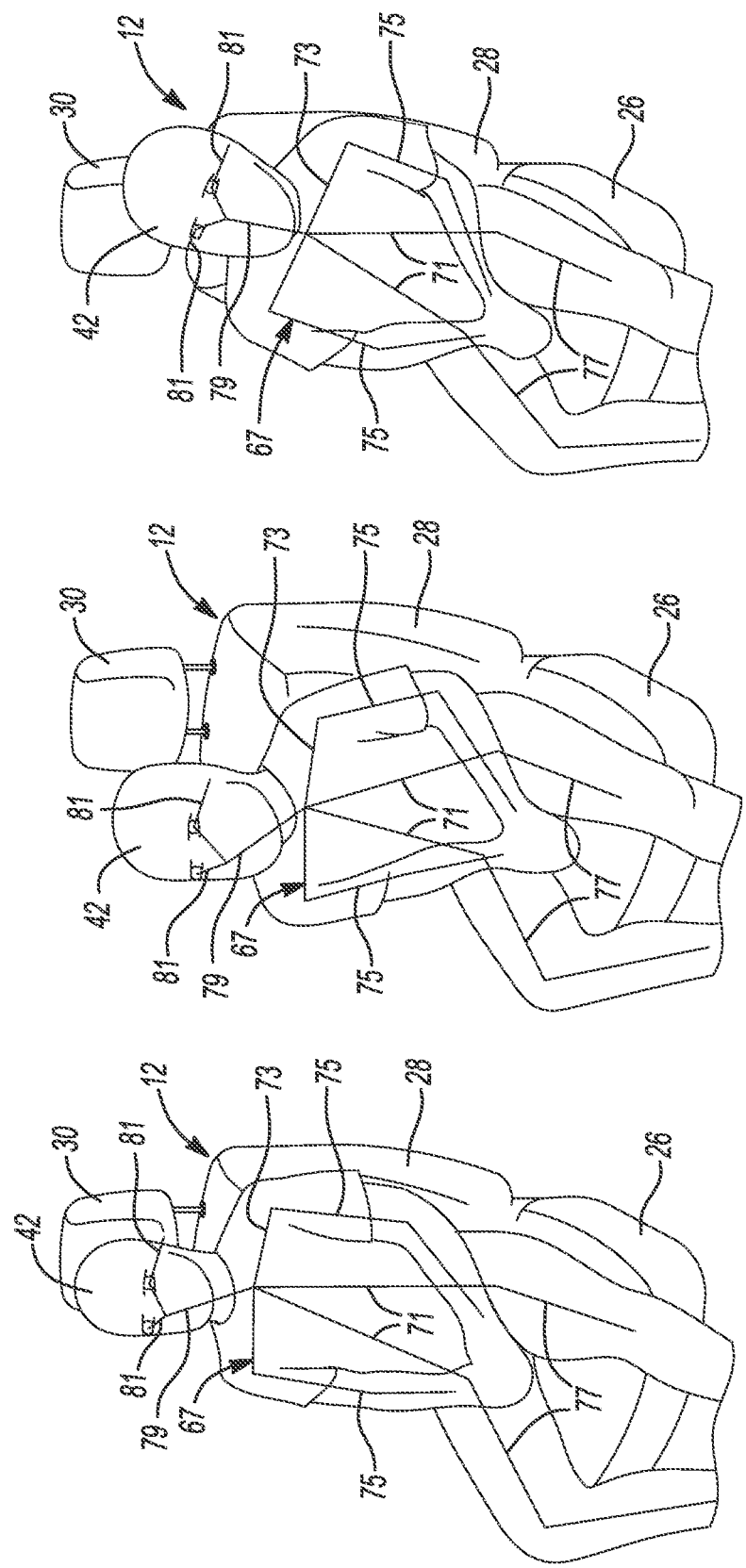

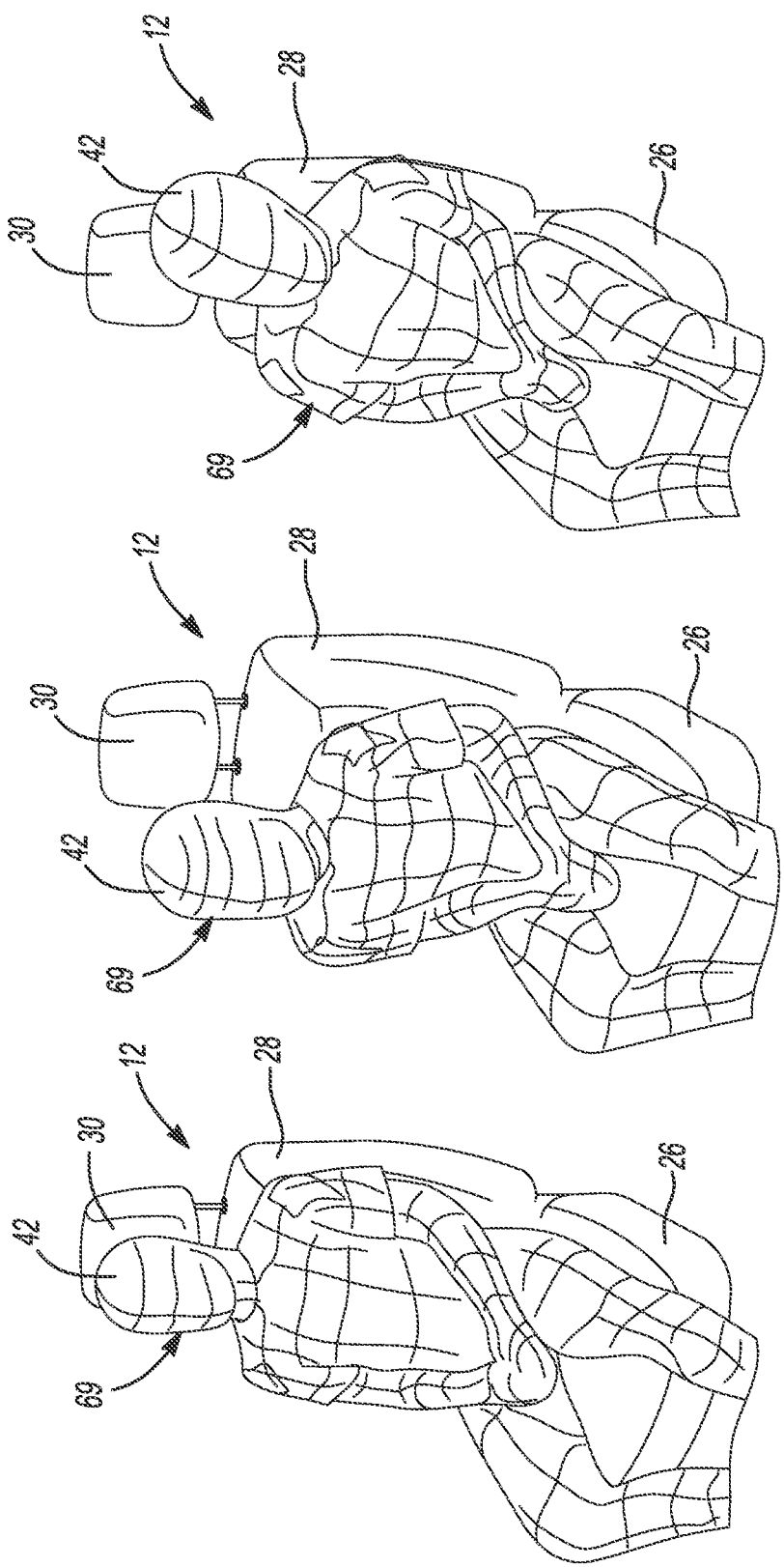

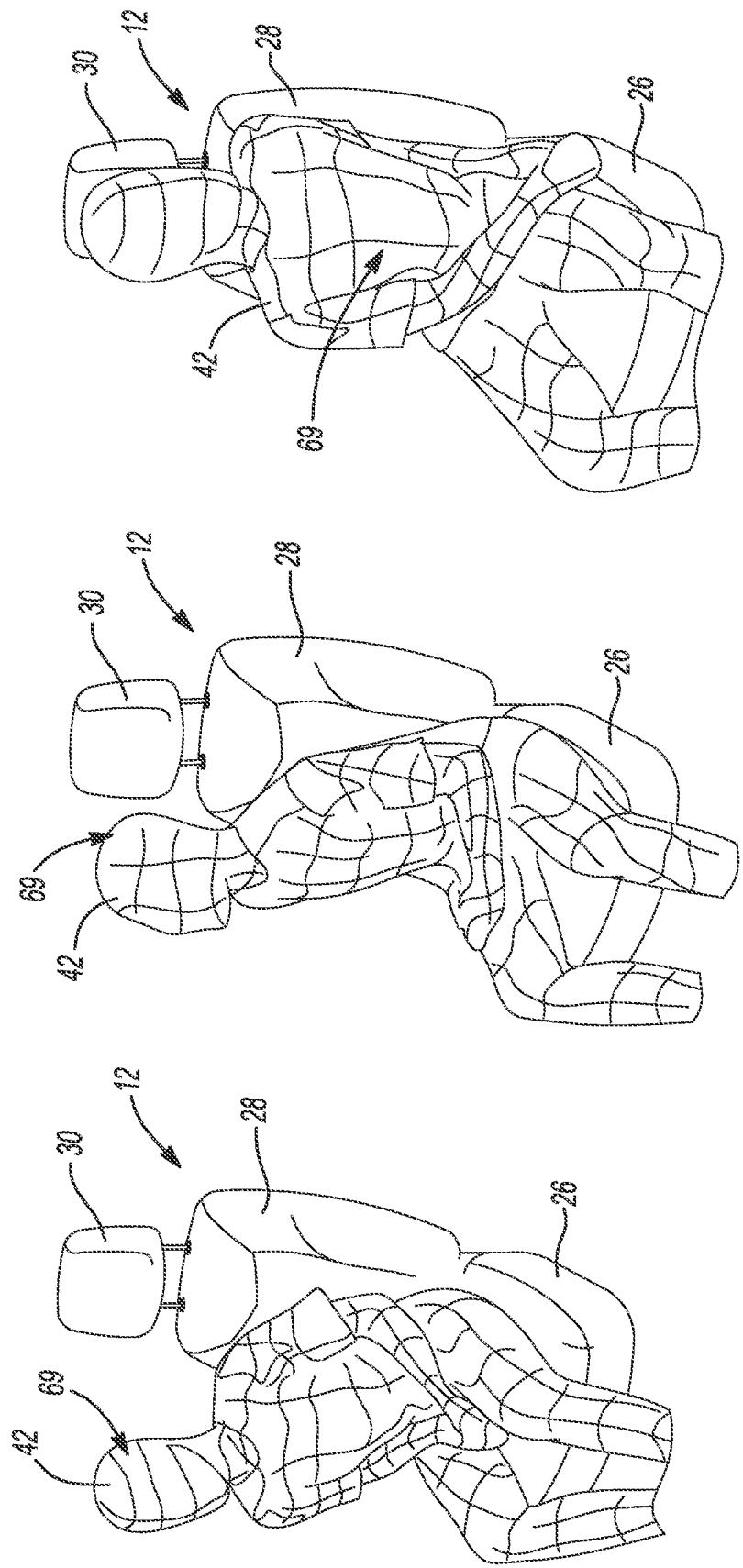

SYSTEM AND METHOD FOR ASSESSING SEATBELT ROUTING USING SEATBELT ROUTING ZONES THAT ARE BASED ON SIZE AND SHAPE OF OCCUPANT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for assessing seatbelt routing using seatbelt routing zones that are based on the size and shape of an occupant.

A three-point seatbelt includes a lap belt and a shoulder belt. Typically, one end of the lap belt is secured directly to a vehicle body structure, one end of the shoulder belt is secured to the vehicle body structure via a seatbelt retractor, and the lap and shoulder belts meet at the location of a tongue. To secure the occupant in a vehicle seat, the seatbelt is routed around the occupant, and the tongue is fastened in a seatbelt buckle. The seatbelt is routed properly when the lap belt extends across the waist of the occupant and the shoulder belt extends diagonally across the torso of the occupant and over the occupant's shoulder.

There are a number of ways in which a seatbelt may be routed improperly. For example, the lap belt may be routed underneath an occupant, and the shoulder belt may be routed on the wrong side of an occupant's head, under an occupant's arm, or outside of an occupant's arm. In another example, when an occupant is in a booster seat, the lap belt may be routed above hooked wings of the booster seat.

SUMMARY

An example of a system according to the present disclosure includes an in-cabin sensor, a seatbelt routing zone module, and a seatbelt routing classification module. The in-cabin sensor is operable to generate an image of an occupant in a vehicle seat. The seatbelt routing zone module is configured to generate a seatbelt routing zone based on at least one of a size of the occupant in the image and a shape of the occupant. The seatbelt routing classification module is configured to determine whether a seatbelt is routed properly around the occupant based on whether the seatbelt is at least partially within the seatbelt routing zone.

In one aspect, the seatbelt routing zone module is configured to determine a size of the seatbelt routing zone, a shape of the seatbelt routing zone, and a location of the seatbelt routing zone based on at least one of the size of the occupant and the shape of the occupant.

In one aspect, the seatbelt routing zone module is configured to adjust the location of the seatbelt routing zone and the shape of the seatbelt routing zone based on a posture of the occupant in the image.

In one aspect, the system further includes a landmark module configured to generate a landmark representing a geometry of the occupant in the image and a posture of the occupant in the image, and the seatbelt routing zone module is configured to generate the seatbelt routing zone based on the landmark.

In one aspect, the seatbelt routing zone module is configured to determine a size of the seatbelt routing zone, a shape of the seatbelt routing zone, and a location of the seatbelt routing zone based on at least one of the size of the occupant and the shape of the occupant as indicated by the landmark.

In one aspect, the seatbelt routing zone module is configured to adjust the location of the seatbelt routing zone and the shape of the seatbelt routing zone based on the posture of the occupant as indicated by the landmark.

In one aspect, the landmark includes at least one of a stick figure representation of the occupant and a shell representation of the occupant.

In one aspect, the system further includes a user interface device, and the seatbelt routing zone module controls the user interface device to instruct the occupant to sit vertically before the routing of the seatbelt is assessed.

In one aspect, the seatbelt routing zone includes a proper seatbelt routing zone and an improper seatbelt routing zone, and the seatbelt routing classification module is configured to determine whether the seatbelt is properly routed based on an amount of the seatbelt disposed within the proper and improper seatbelt routing zones.

In one aspect, the seatbelt routing classification module is configured to determine that an actual routing of the seatbelt corresponds to one of the proper and improper seatbelt routing zones when the amount of the seatbelt disposed within the one of the proper and improper seatbelt routing zones is greater than at least one of (i) the amount of the seatbelt disposed within any of the other proper and improper seatbelt routing zones and (ii) a predetermined amount.

In one aspect, the proper seatbelt routing zone includes at least one of a proper shoulder belt zone and a proper lap belt routing zone, and the improper seatbelt routing zone includes at least one of an incorrect side of head zone, an under arm zone, and an outside arm zone.

In one aspect, the proper shoulder belt zone extends diagonally across a torso of the occupant from a first side of the occupant adjacent to a seatbelt buckle of the vehicle seat to a first shoulder of the occupant on a second side of the occupant opposite of the first side, the proper lap belt zone extends horizontally over the lap of an occupant from the first side of the occupant to the second side of the occupant, the incorrect side of head zone extends vertically from the proper shoulder belt zone to a second shoulder of the occupant on the first side of the occupant, the under arm zone extends diagonally across the torso of the occupant from the first side of the occupant to an underarm area of the occupant on the second side of the occupant, and the outside arm zone extends vertically along a humerus of the occupant on the second side of the occupant.

In one aspect, when a booster seat is present in the vehicle seat, the proper seatbelt routing zone is disposed under hooked wings on the booster seat and the improper seatbelt routing zone is disposed above the hooked wings on the booster seat.

In one aspect, the proper seatbelt routing zone includes a five-point seatbelt zone when a child restraint seat with a five-point seatbelt is present within the vehicle seat, and the five-point seatbelt zone includes a first portion that extends vertically from a neck and clavicles of the occupant to a waist of the occupant and a second portion that extends horizontally along the waist of the occupant to opposite sides of the occupant.

In one aspect, the seatbelt routing zone module is configured to generate the seatbelt routing zone based on whether a child restraint seat is present in the vehicle seat.

In one aspect, the seatbelt routing zone module is configured to adjust a location of the seatbelt routing zone based on a location of the occupant in the image.

In one aspect, the seatbelt routing zone is three-dimensional.

In one aspect, the seatbelt routing classification module is configured to determine that the seatbelt is improperly routed if the seatbelt is not in front of the occupant when the seatbelt is secured to a seatbelt buckle of the vehicle seat.

Another example of a system according to the present disclosure includes an in-cabin sensor, a landmark module, a seatbelt routing zone module, and a seatbelt routing classification module. The in-cabin sensor is operable to generate an image of an occupant in a vehicle seat. The landmark module is configured to generate a landmark based on the image. The landmark includes at least one of a stick figure representation of the occupant and a shell representation of the occupant. The seatbelt routing zone module is configured to generate a seatbelt routing zone based on the landmark, determine a size of the seatbelt routing zone, a shape of the seatbelt routing zone, a location of the seatbelt routing zone based on at least one of a size of the occupant and a shape of the occupant as indicated by the landmark, and adjust the location of the seatbelt routing zone and the shape of the seatbelt routing zone based on a posture of the occupant as indicated by the landmark. The seatbelt routing classification module is configured to determine whether a seatbelt is routed properly around the occupant based on whether the seatbelt is at least partially within the seatbelt routing zone.

In one aspect, the seatbelt routing zone includes a proper seatbelt routing zone and an improper seatbelt routing zone, and the seatbelt routing classification module is configured to determine an amount of the seatbelt disposed within the proper and improper seatbelt routing zones and determine that an actual routing of the seatbelt corresponds to one of the proper and improper seatbelt routing zones when the amount of the seatbelt disposed within the one of the proper and improper seatbelt routing zones is greater than at least one of (i) the amount of the seatbelt disposed within any of the other proper and improper seatbelt routing zones and (ii) a predetermined amount.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 16 through 21 are perspective views similar to those shown in FIGS. 5 through 10 except that the example landmarks include a different type of stick figure representation of the occupant than that shown in FIG. 1;

FIGS. 22 through 27 are perspective views similar to those shown in FIGS. 5 through 10 except that the example landmarks include a three-dimensional mesh representation of the occupant.

DETAILED DESCRIPTION

A system and method according to the present disclosure assess seatbelt routing to determine whether a seatbelt is routed properly or improperly and, if the seatbelt is routed improperly, to determine how the seatbelt is routed improperly. The system and method may assess the seatbelt routing based on inputs from an occupant detection sensor, a seatbelt buckle sensor, and/or an in-cabin sensor such as a camera. In one example, the system and method generate seatbelt routing zones based on the size and shape of an occupant, and assess the routing of a seatbelt based on the extent to which the seatbelt is disposed within each seatbelt routing zone. In another example, the system and method generate landmarks representing the geometry of the occupant, and generate the seatbelt routing zones based on the size and shape of the occupant as indicated by the landmarks. In another example, the system and method adjust the shape, location, and/or orientation of the landmarks and the seatbelt routing zones so that as the occupant moves, the landmarks and the seatbelt routing zones move with the occupant.

The seatbelt routing zones provide a simplified way of determining whether a seatbelt is improperly routed and, if so, how the seatbelt is improperly routed. The landmarks provide a simplified representation of the occupant's body that may be used to generate the seatbelt routing zones. Thus, the seatbelt routing zones and the landmarks enable assessing seatbelt routing with minimal processing power.

Figure 1:
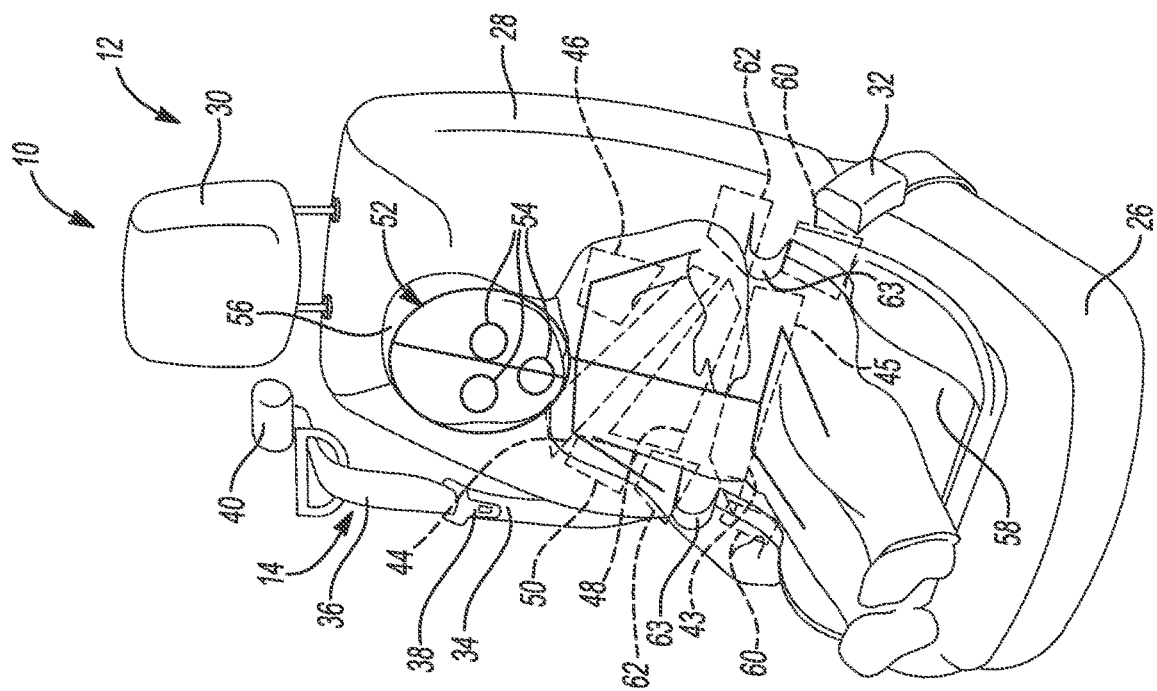
FIG. 1 is a perspective view of an occupant in a vehicle seat with example landmarks and example seatbelt routing zones superimposed on the occupant, and a functional block diagram of an example seatbelt routing assessment system according to the present disclosure.
Figure 2:
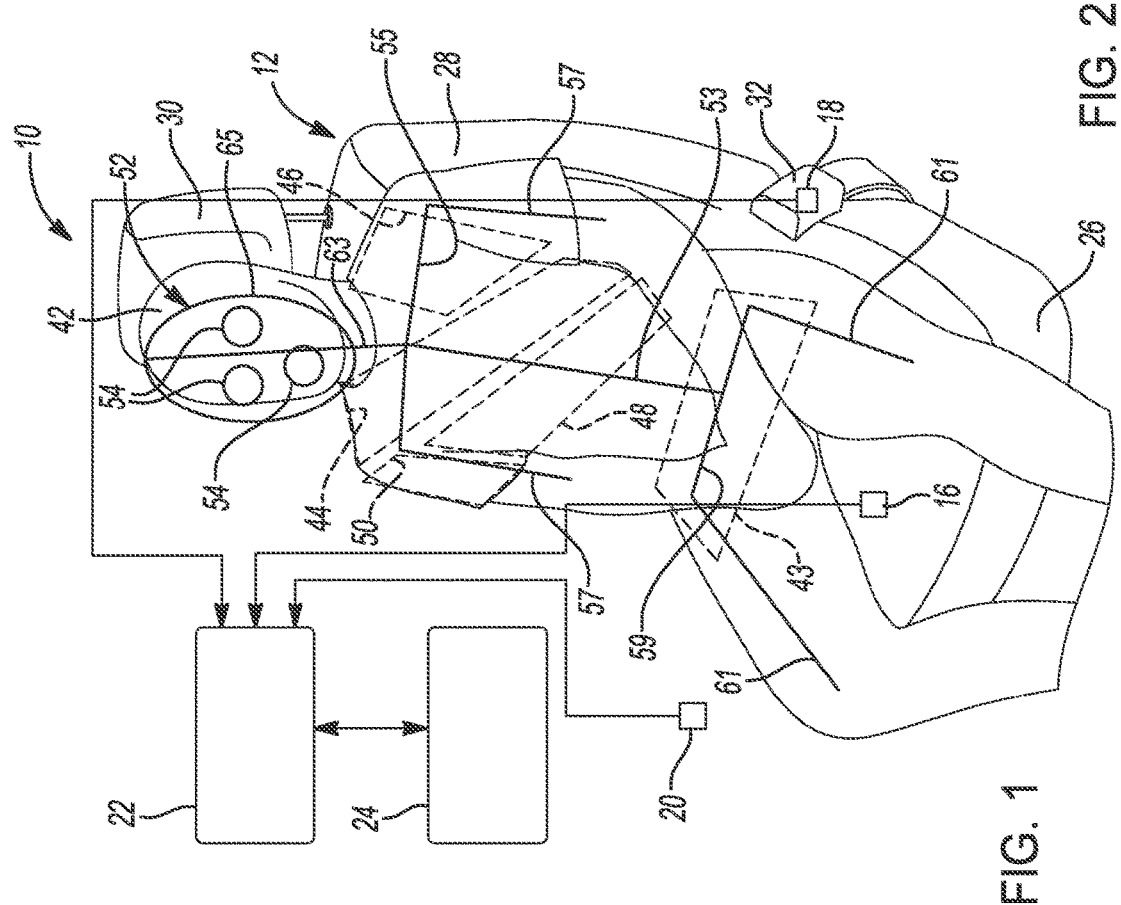
FIG. 2 is a perspective view of an occupant in a booster seat on a vehicle seat with example landmarks and example seatbelt routing zones superimposed on the occupant.

Referring now to FIGS. 1 and 2, a vehicle system 10 includes a vehicle seat 12, a seatbelt 14, an occupant detection sensor 16, a seatbelt buckle sensor 18, an in-cabin sensor 20, a vehicle control module 22, and a user interface device 24. The vehicle seat 12 includes a seat bottom 26, a seat back 28, a headrest 30, and a seatbelt buckle 32. The seatbelt buckle 32 is secured to the seat bottom 26.

Figure 13:
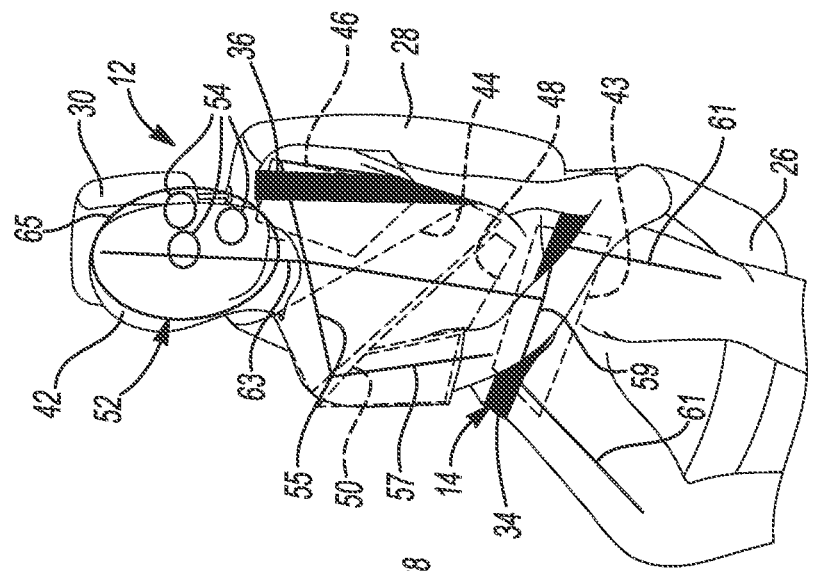
FIGS. 11 through 13 are perspective views similar to that shown in FIG. 1 illustrating examples of how a seatbelt may be routed around the occupant.
Figure 12:
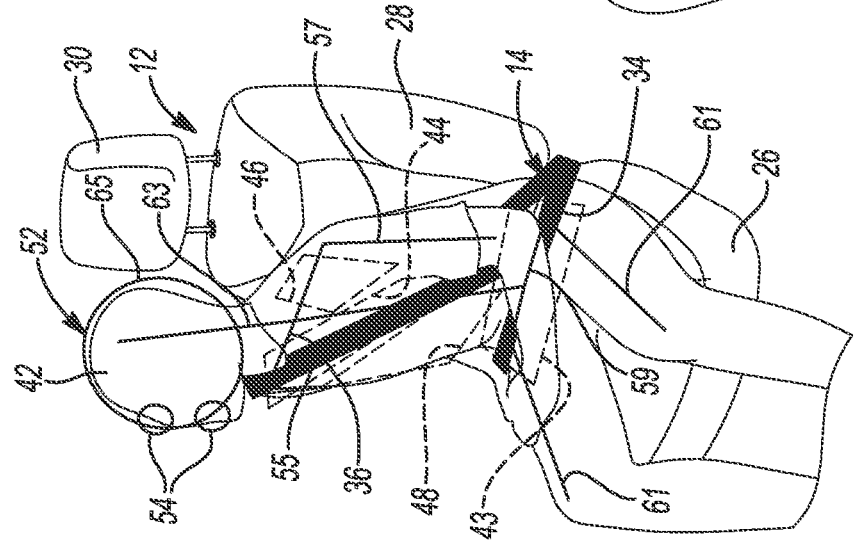
Figure 11:
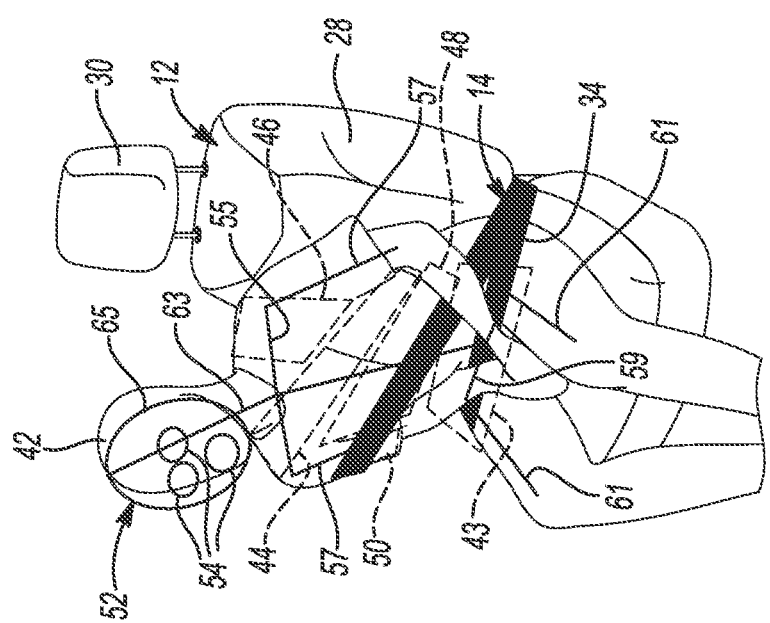

With brief additional reference to FIGS. 11 through 13, the seatbelt 14 is a three-point seatbelt that includes a lap belt portion 34, a shoulder belt portion 36, and a tongue 38. One end of the seatbelt 14 may be secured to a vehicle body structure or seat structure (not shown) via a seatbelt retractor 40, and the other end of the seatbelt 14 may be secured directly to the vehicle body structure or seat structure. The seatbelt 14 may be routed around an occupant 42 sitting in the vehicle seat 12, and its tongue 38 may be inserted into the seatbelt buckle 32 to securely restrain the occupant 42 in the vehicle seat 12.

With continued reference to FIGS. 1 and 2, the occupant detection sensor 16 is used to detect when the occupant 42 is sitting in the vehicle seat 12. In the example shown, the occupant detection sensor 16 is disposed in the seat bottom 26. Additionally or alternatively, the occupant detection sensor 16 may be disposed in the seat back 28. The occupant detection sensor 16 may include a resistance sensor, a pressure sensor, a weight sensor, a capacitive sensor, a biometric sensor, or a combination thereof. The occupant detection sensor 16 outputs a signal indicating when the occupant 42 is sitting in the vehicle seat 12.

The seatbelt buckle sensor 18 is used to detect when the tongue 38 of the seatbelt 14 is secured in the seatbelt buckle 32. The seatbelt buckle sensor 18 may be disposed within the seatbelt buckle 32. The seatbelt buckle sensor 18 may include a Hall-effect sensor, a reed switch, a mechanical sensor, or a combination thereof. The seatbelt buckle sensor 18 outputs a signal indicating when the tongue 38 of the seatbelt 14 is secured in the seatbelt buckle 32.

The in-cabin sensor 20 is disposed within a vehicle cabin (not shown) and is positioned so that its field of view includes the vehicle seat 12 and the seatbelt 14. The in-cabin sensor 20 may include a camera, an infrared sensor, an ultrasonic sensor, a radar sensor, a lidar sensor, other technology capable of remotely detecting objects, humans, child restraint seats, and vehicle systems such as vehicle seats and seatbelts, or a combination thereof. The in-cabin sensor 20 generates images of the vehicle seat 12, the seatbelt 14 and, if applicable, the occupant 42 or child restraint seat sitting on the vehicle seat 12. The in-cabin sensor 20 outputs a signal indicating the images captured by the in-cabin sensor 20. The components of the seatbelt 12, such as the seatbelt webbing, may have detectable elements on them, such as infrared reflective and absorbing markings, illuminating fiber optic strands, or metal threads within the webbing fabric weave.

The vehicle control module 22 assesses the routing of the seatbelt 14 to determine whether the seatbelt 14 is properly routed around the occupant 42. The vehicle control module 22 may assess the seatbelt routing based on inputs from the occupant detection sensor 16, seatbelt buckle sensor 18, and the in-cabin sensor 20. In one example, the vehicle control module 22 generates seatbelt routing zones based on the size and shape of the occupant 42, and assesses the seatbelt routing based on the extent to which the seatbelt 14 is disposed within each seatbelt routing zone. In another example, the vehicle control module 22 generates landmarks representing the geometry of the occupant 42, and generates the seatbelt routing zones based on the size and shape of the occupant 42 as indicated by the landmarks.

In the example shown in FIG. 1, the occupant 42 is an adult occupant siting directly on the vehicle seat 12 with no objects therebetween. In addition, the seatbelt routing zones include a proper lap belt zone 43, a proper shoulder belt zone 44, an incorrect side of head zone 46, an under arm zone 48, and an outside arm zone 50. Furthermore, the landmarks include a skeleton or stick figure representation 52 of the occupant 42 and simplified representations 54 of facial features (e.g., eyes, mouth) of the occupant 42. The stick figure representation 52 includes a line 53 representing the torso of the occupant 42, a line 55 representing the shoulder or clavicle line of the occupant 42, lines 57 presenting the upper arms or humeri of the occupant 42, a line 59 representing the waste or pelvic line of the occupant 42, lines 61 representing the upper legs or femurs of the occupant 42, a line 63 representing the neck of the occupant 42, and an oval 65 representing the head of the occupant 42.

In the example shown in FIG. 2, a child occupant 56 is sitting in a booster seat 58 disposed on the vehicle seat 12. In addition, the seatbelt routing zones include the seatbelt routing zones shown in FIG. 1, additional proper belt routing zones 60, and improper belt routing zones 62. The proper belt routing zones 60 are disposed below the hooked wings 63 on the booster seat 58 and the improper belt routing zones 62 are disposed above hooked wings 63 on the booster seat 58. Furthermore, the landmarks include the stick figure representation 52 of the child occupant 56 and the facial feature representations 54.

The vehicle control module 22 may control the user interface device 24 to generate a message indicating whether the seatbelt 14 is properly or improperly routed around the occupant 42. If the seatbelt 14 is improperly routed around the occupant 42, the message may also indicate the improper routing configuration (i.e., how the seatbelt 14 is improperly routed). The user interface device 24 is operable to generate a visual message (e.g., text, a light, and/or a symbol), an audible message (e.g., a chime), and/or a tactile message (e.g., a vibration). The user interface device 24 may include an electronic display (e.g., a touchscreen), a speaker, and/or a vibrating motor.

Figure 3:
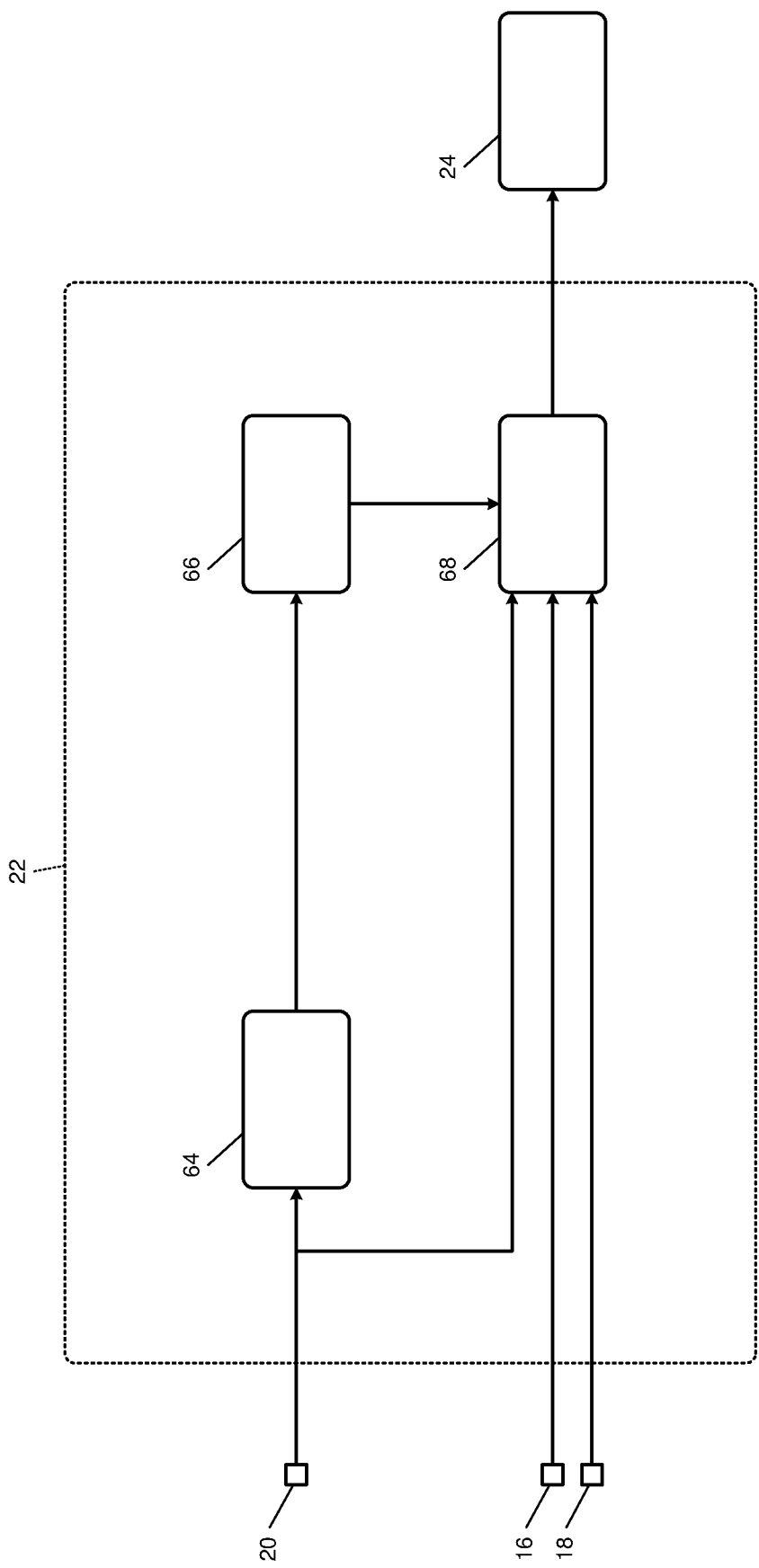
FIG. 3 is a functional block diagram of an example vehicle control module according to the present disclosure.

Referring now to FIG. 3, an example implementation of the vehicle control module 22 includes a landmark module 64, a seatbelt routing zone module 66, and a seatbelt routing classification module 68. The landmark module 64 generates landmarks such as the stick figure representations 52 and the facial feature representations 54 shown in FIGS. 1 and 2. The landmark module 64 generates the landmarks, in a size and/or shape proportional manner, based on the size and/or shape of an occupant in the vehicle seat 12 as indicated by the image generated by the in-cabin sensor 20. The landmarks represent the geometry of the occupant in the image and the posture of the occupant in the image.

The landmark module 64 may detect objects in the image using image processing techniques such as edge detection, segmentation, dilation and erosion, and template matching, machine learning techniques such as deep neural networks, or a combination of two or more of the aforementioned techniques. The landmark module 64 may determine whether the objects correspond to a body part based on predetermined relationships between (i) object sizes and shapes and (ii) body parts. In this manner, the landmark module 64 may identify the main body parts (e.g., head, torso, arms, legs) of the occupant. The landmark module 64 may superimpose the landmarks in a size and/or shape proportional manner over the corresponding body parts of the occupant to provide a simplified representation of the geometry and posture of the occupant.

The landmark module 64 may also determine the position of the vehicle seat and the presence and/or position of a child restraint seat and assume that the occupant is seated in vertical alignment with such a seat when seatbelt routing assessment begins (e.g., when the landmark module 64 first generates the landmarks). Additionally or alternatively, the seatbelt routing zone module 66 may control the user interface device 24 to instruct the occupant to sit vertically before the seatbelt routing is assessed (e.g., at the start of a ride and/or occasionally during a ride). For example, when the occupant is secured using the three-point seatbelt 14, the seatbelt routing zone module 66 may control the user interface device 24 to instruct the occupant to sit with its torso positioned on the seat bottom 26, its spine vertically aligned, its back on the seat back 28, its head up looking in the direction of the in-cabin sensor 20, and its hands and arms at its side to provide a clear view of the lap and torso areas. In addition, the seatbelt routing zone module 66 may control the user interface device 24 to instruct the occupant to limit its movement during the seatbelt routing assessment process.

The seatbelt routing zone module 66 generates seatbelt routing zones such as the proper lap belt zone 43, the proper shoulder belt zone 44, the incorrect side of head zone 46, the under arm zone 48, the outside arm zone 50, the proper belt routing zones 60, and the improper belt routing zones 62 shown in FIGS. 1 and 2. These seatbelt routing zones do not overlap one another. The seatbelt routing zone module 66 determines the proportional size of the seatbelt routing zones, the proportional shape of the seatbelt routing zones, and the location of the seatbelt routing zones based on the size of the occupant as indicated by the landmarks. The seatbelt routing zone module 66 adjusts the locations and shape of the seatbelt routing zones to correspond to the posture of the occupant as indicated by the landmarks.

In one example, the seatbelt routing zone module 66 generates the seatbelt routing zones using templates and adjusts the sizes, shapes, and locations of the seatbelt routing zones based on the size and shape of the occupant as indicated by the landmarks. Each template corresponds to one of the seatbelt routing zones. The templates may be developed by performing a series of seatbelt routing assessments while the seatbelt is properly routed and improperly routed in various ways. The geometry of templates, and the way in which the seatbelt routing zones are adjusted based on the size and shape of the occupant, may be optimized so that the seatbelt routing zones correspond to the actual routing of the seatbelt as verified by a population of human subjects.

The seatbelt routing classification module 68 determines whether the seatbelt 14 is properly routed around the occupant based on the amount of the seatbelt 14 disposed in each seatbelt routing zone (e.g., the area of the seatbelt 14 disposed in each seatbelt routing zone or the percentage of the area of the seatbelt 14 disposed in each seatbelt routing zone relative to the area of that zone). The seatbelt routing classification module 68 may determine that amount based on the number of pixels corresponding to the seatbelt 14 that are within each seatbelt routing zone. In one example, the seatbelt routing classification module 68 determines that the lap belt portion 34 is properly routed when the amount of the seatbelt 14 disposed in the proper lap belt zone 43 is greater than a predetermined amount, which may be an area or a percentage. In another example, the seatbelt routing classification module 68 determines that the shoulder belt portion 36 is properly routed when the amount of the seatbelt 14 disposed in the proper shoulder belt zone 44 is greater than the amount of the seatbelt 14 disposed in each of the incorrect side of head zone 46, the under arm zone 48, and the outside arm zone 50. The area or percentage needed to deem that the seatbelt 14 is located within a zone can vary by zone (e.g., based on the size, shape, and location of the zone).

When the seatbelt routing classification module 68 determines that the seatbelt 14 is not properly routed, the seatbelt routing classification module 68 controls the user interface device 24 to generate a message indicating the same. The message may also indicate the specific improper routing configuration of the seatbelt 14. The seatbelt routing classification module 68 controls the user interface device 24 by outputting a signal thereto indicating whether to generate a message and, if so, the type and/or content of the message. The seatbelt routing classification module 68 may also control the user interface device 24 to display the image captured by the in-cabin sensor 20, the landmarks, and/or the seatbelt routing zones. In the description above, the seatbelt routing classification module 68 generates seatbelt routing zones for an occupant sitting directly on the vehicle seat 12 or on the booster seat 58 and assesses routing of the seatbelt 14 using the seatbelt routing zones. In a similar manner, the seatbelt routing classification module 68 may generate seatbelt routing zones for an occupant in a child restraint seat with a five-point seatbelt, such as a forward-facing child restraint seat 83 shown in FIG. 14 or a rearward-facing child restraint seat, and assess the routing of the five-point seatbelt using the seatbelt routing zones. The seatbelt routing classification module 68 may also generate seatbelt routing zones for an occupant in a lateral child bed restraint and assess seatbelt routing using the seatbelt routing zones in a similar manner.

Figure 4:
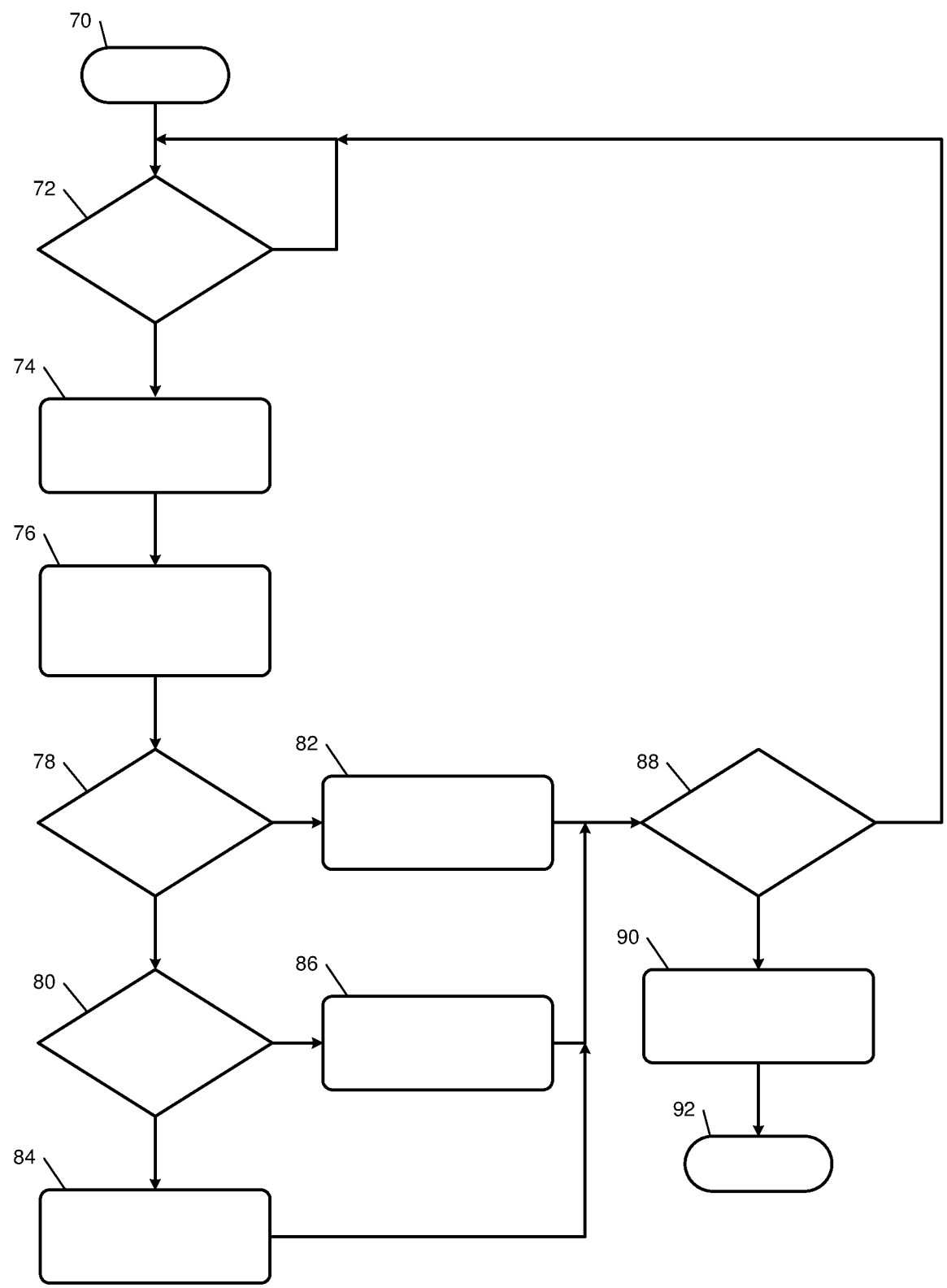
FIG. 4 is a flowchart illustrating an example seatbelt routing assessment method according to the present disclosure.
Figure 7:
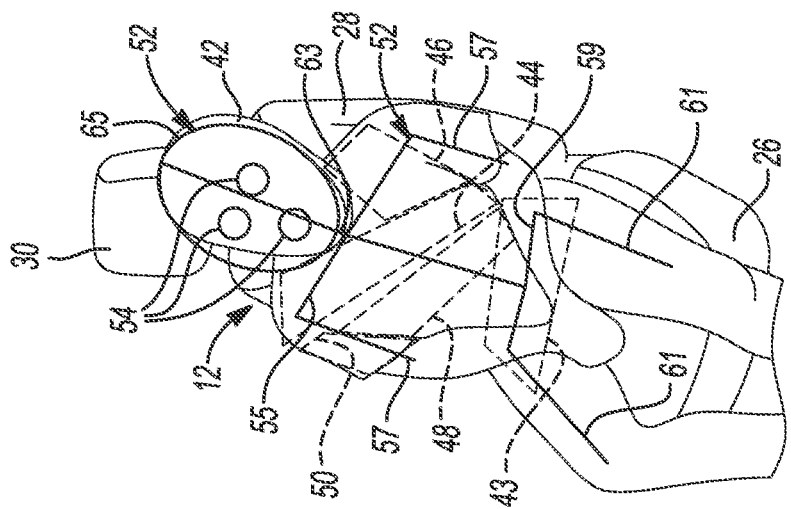
FIGS. 5 through 10 are perspective views similar to that shown in FIG. 1 illustrating examples of how the seatbelt routing zones move with the landmarks as the occupant moves in the vehicle seat.
Figure 6:
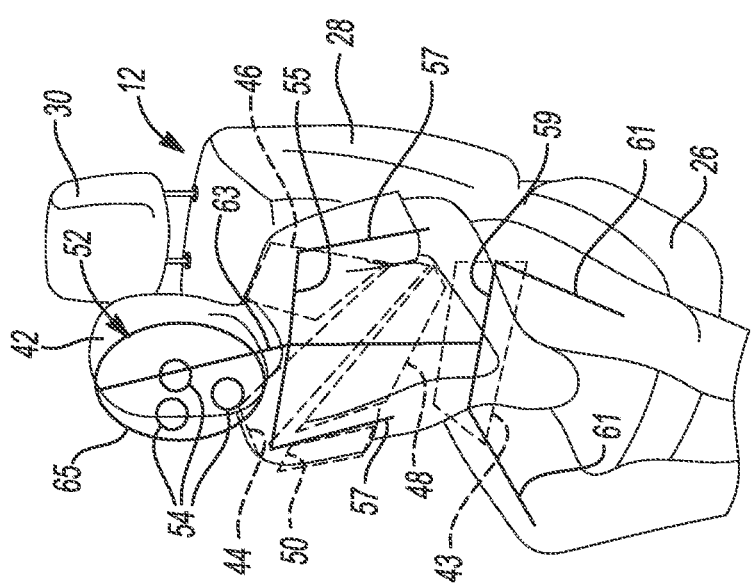

Referring now to FIG. 4, an example method of assessing seatbelt routing begins at 70. In the description of the methods set forth below, the modules of FIG. 3 perform the steps of the methods. However, the particular modules that perform the steps of the methods may differ from the description below. Additionally or alternatively, one or more steps of the methods may be performed independent of any module.

At 72, the seatbelt routing classification module 68 determines whether an occupant is present in the vehicle seat 12 based on an input from the occupant detection sensor 16 or the in-cabin sensor 20. If an occupant is present in the vehicle seat 12, the method continues at 76. Otherwise, the method remains at 72.

At 74, the landmark module 64 generates landmarks, such as the stick figure representations 52 and the facial feature representations 54 of FIGS. 1 and 2, in proportion to the size and/or shape of the occupant and aligned with the occupant's location as indicated by the image generated by the in-cabin sensor 20. For example, the stick figure representation 52 of the adult occupant 42 shown in FIG. 1 is taller and wider than the stick figure representation 52 of the child occupant 56 shown in FIG. 2 since the adult occupant 42 is larger than the child occupant 56. In another example, the facial feature representations 54 shown in FIG. 1 are higher than the facial feature representations 54 shown in FIG. 2 since the adult occupant 42 is taller than the child occupant 56.

The landmark module 64 may generate landmarks other than the stick figure representation 52 and the facial feature representations 54 based on the size and/or shape of the occupant as indicated by the image generated by the in cabin sensor 20. For example, the landmark module 64 may generate a stick figure representation 67 of the occupant shown in FIGS. 16 through 21 or a three-dimensional shell representation 69 of the occupant shown in FIGS. 22 through 27. The stick figure representation 67 of FIGS. 16 through 21 includes lines 71 representing the torso of the occupant 42, a line 73 representing the shoulder or clavicle line of the occupant 42, lines 75 representing the arms of the occupant 42, lines 77 representing the legs of the occupant 42, a line 79 representing the neck and lower head of the occupant 42, and lines 81 representing facial features of the occupant 42 (e.g., nose, eyes). The three-dimensional shell representation 69 of FIGS. 22 through 27 may be a three-dimensional mesh (or wireframe) representation of the occupant as shown or a three-dimensional continuous surface representation of the occupant from which the body parts (e.g. arms, torso, head, legs) of the occupant can be extracted as landmarks.

In various implementations, the landmark module 64 may generate selected portions of one or more of the landmarks discussed above. For example, referring briefly to FIG. 1, the landmark module 64 may generate points at the shoulder locations where the arm lines 57 and the clavicle line 55 intersect one another. In another example, the landmark module 64 may generate points at the hip locations where the leg lines 61 and the pelvic line 59 intersect one another.

Figure 5:
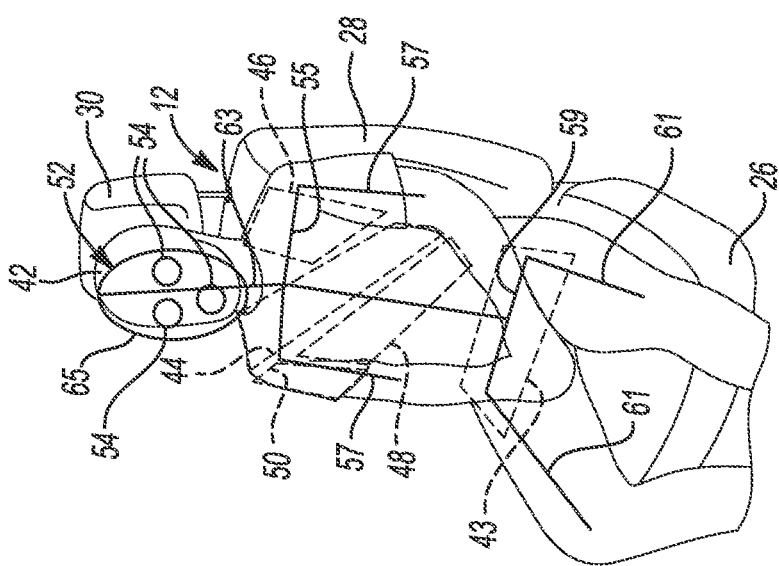
Figure 10:
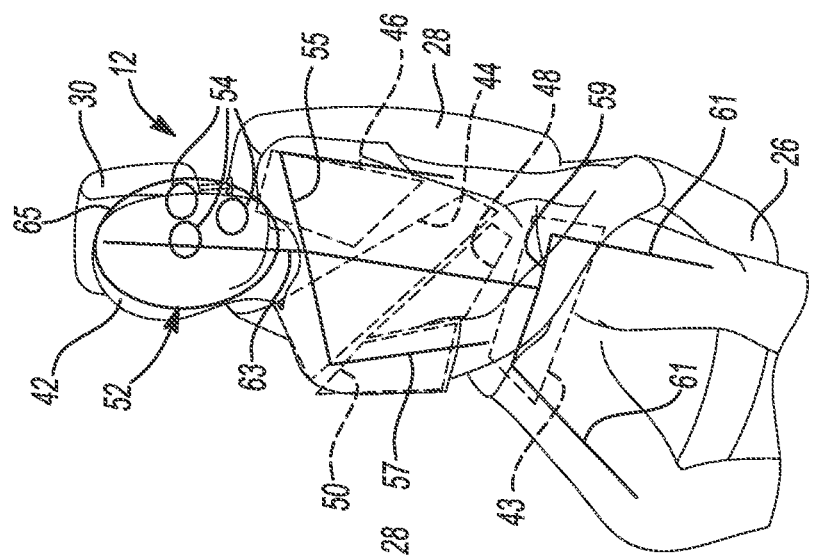

With continued reference to FIG. 4, at 76, the landmark module 64 adjusts the location and/or orientation of the landmarks based on the posture and location of the occupant as indicated by the image generated by the in-cabin sensor 20. Thus, the landmark module 64 moves the landmarks with the occupant as the occupant moves in the vehicle seat 12. FIGS. 5 through 10 illustrate examples of how the landmark module 64 adjusts the location and/or orientation of the landmarks based on the posture and location of the occupant 42. In FIG. 5, the occupant 42 is vertically oriented with its back and head against the seat back 28 and the headrest 30, respectively, and the landmarks 52, 54 are located and oriented to overlay the corresponding features of the occupant 42. In contrast, the occupant 42 is leaning forward in FIG. 6, the occupant 42 is leaning to its left side in FIG. 7, the occupant 42 is leaning to its right side in FIG. 8, the occupant is twisted toward its right side in FIG. 9, and the occupant 42 is twisted toward its left side in FIG. 10. As the occupant 42 shifts to each of the postures shown in FIGS. 6 through 10, the landmark module 64 adjusts the location and orientation of the landmarks 52, 54 so that they continue to overlay the corresponding features of the occupant 42.

FIGS. 5 through 10 and FIGS. 16 through 27 illustrate examples of how the landmark module 64 adjusts the location and/or orientation of the landmarks based on the posture and location of the occupant 42. In FIGS. 5, 16, and 22, the occupant 42 is vertically oriented with its back and head against the seat back 28 and the headrest 30, respectively, and the landmarks 52, 54, 67, 69 are located and oriented to overlay the corresponding features of the occupant 42. In contrast, the occupant 42 is leaning forward in FIGS. 6, 17, and 23, the occupant 42 is leaning to its left side in FIGS. 7, 18, and 24, the occupant 42 is leaning to its right side in FIGS. 8, 19, and 25, the occupant is twisted toward its right side in FIGS. 9, 20, and 26, and the occupant 42 is twisted toward its left side in FIGS. 10, 21, and 27. As the occupant 42 shifts to each of the postures shown in FIGS. 5 through 10 and FIGS. 16 through 27, the landmark module 64 adjusts the location and orientation of the landmarks 52, 54, 67, 69 so that they continue to overlay the corresponding features of the occupant 42.

With continued reference to FIG. 4, at 78, the seatbelt routing classification module 68 determines whether a child restraint seat, such as the booster seat 58, the forward-facing child restraint seat 83, a rearward-facing child restraint seat, or a lateral child bed restraint, is present in the vehicle seat 12. The seatbelt routing classification module 68 may make this determination based on the image from the in-cabin sensor 20. For example, the seatbelt routing classification module 68 may detect objects in the image using edge detection techniques, and determine whether the objects correspond to a child restraint seat based on predetermined relationships between (i) object sizes, shapes, and locations and (ii) child restraint seats. To help with this determination, the seatbelt routing classification module 68 may compare the location of the vehicle seat 12 to the location of an object that may correspond to a child restraint seat in order to determine the object's shape, size, and location. If a child restraint seat is present in the vehicle seat 12, the method continues at 80. Otherwise, the method continues at 82.

At 82, the seatbelt routing zone module 66 generates standard routing zones based on the landmarks. For example, the seatbelt routing zone module 66 may determine the size, shape, and location of the standard routing zones based on the size and shape of the occupant in the vehicle seat 12 as indicated by the landmarks. Standard routing zones include seatbelt routing zones for an adult occupant such as the proper lap belt zone 43, the proper shoulder belt zone 44, the incorrect side of head zone 46, the under arm zone 48, and the outside arm zone 50 shown in FIG. 1. Thus, the seatbelt routing zone module 66 determines which types of seatbelt routing zones to generate based on whether or not a child restraint seat is present in the vehicle seat 12.

At 80, the seatbelt routing classification module 68 determines whether a child restraint seat with a five-point seatbelt is present in the vehicle seat 12. The seatbelt routing classification module 68 may make this determination based on one or more images from the in-cabin sensor 20. For example, the seatbelt routing classification module 68 may detect objects in the image using edge detection techniques, and determine whether the objects correspond to a child restraint seat with a five-point seatbelt based on predetermined relationships between (i) object sizes, shapes, and locations and (ii) features of a child restraint seat with a five-point seatbelt. To help with this determination, the location of the vehicle seat 12 may be compared to the location of an object that may correspond to a child restraint seat in order to determine the object's shape, size, and location. Also, for this determination, the orientation and type of child restraint seat may also be determined. For instance, the child restraint seat may be classified as a rearward-facing child restraint seat, a forward-facing child restraint seat, a booster seat with a back, a booster seat without a back, or a lateral child bed restraint. If a child restraint seat with a five-point seatbelt, such as a forward-facing child restraint seat or a rearward-facing child restraint seat, is present in the vehicle seat 12, the method continues at 84. Otherwise, the method continues at 86.

At 86, the seatbelt routing zone module 66 generates booster routing zones based on the landmarks. For example, the seatbelt routing zone module 66 may determine the size, shape, and location of the booster routing zones based on the size and shape of the occupant as indicated by the landmarks. Booster routing zones include seatbelt routing zones for a child occupant in a booster seat such as the proper belt routing zones 43, 60, the improper belt routing zones 62, the proper shoulder belt zone 44, the incorrect side of head zone 46, the under arm zone 48, and the outside arm zone 50 shown in FIG. 2. Thus, the seatbelt routing zone module 66 determines which types of seatbelt routing zones to generate based on which type of child restraint seat is present in the vehicle seat 12.

Figure 14:
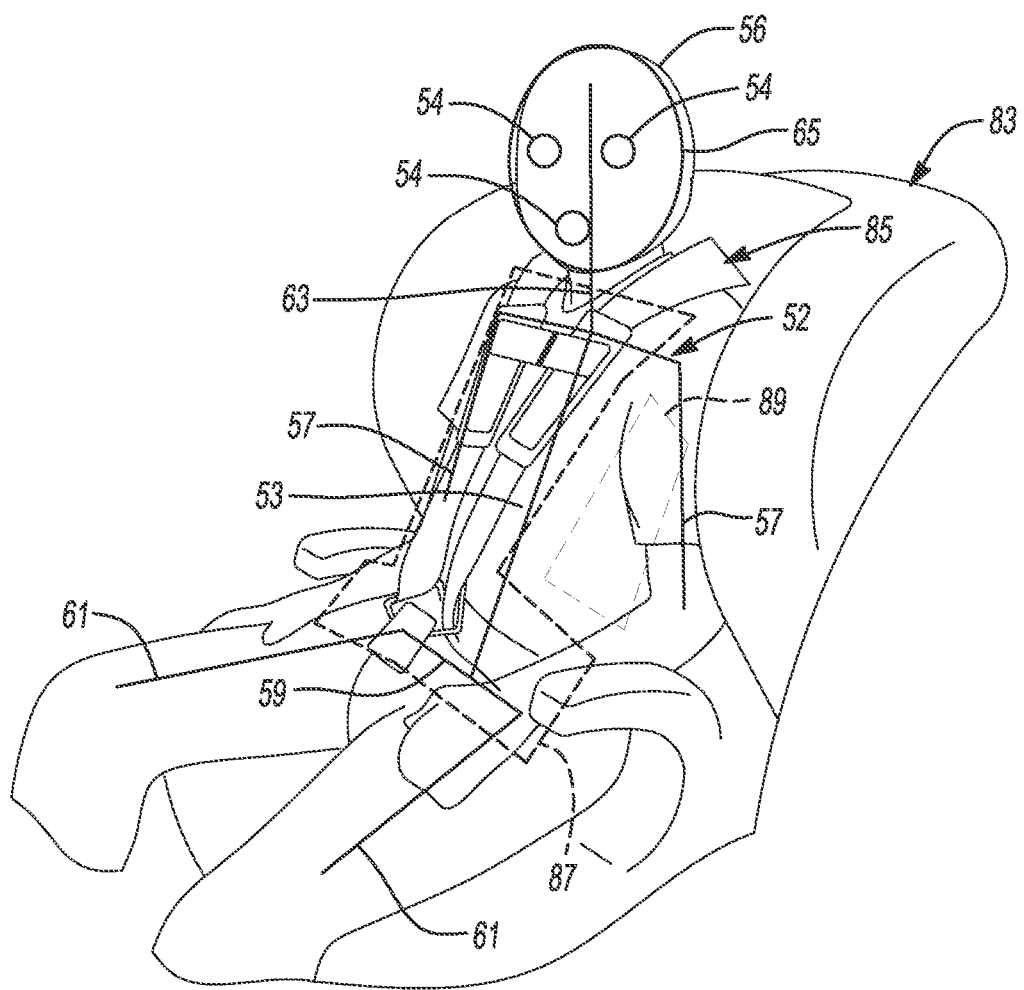
FIG. 14 is a perspective view of an occupant in a child restraint seat with a five-point seatbelt and example landmarks and example seatbelt routing zones superimposed on the occupant.

At 84, the seatbelt routing zone module 66 generates one or more five-point belt routing zones based on the landmarks. For example, the seatbelt routing zone module 66 may determine the size, shape, and location of the five-point belt routing zones based on the size of the occupant as indicated by the landmarks. Five-point belt routing zones include seatbelt routing zones for a child occupant in a child restraint seat with a five-point seatbelt. FIG. 14 illustrates an example of seatbelt routing zones for the child occupant 56 in the forward-facing child restraint seat 83 with a five-point seatbelt 85. Similar seatbelt routing zones may be generated for an occupant in a rearward-facing child restraint seat. The seatbelt routing zones include a proper five-point seatbelt routing zone 87 and one or more improper five-point seatbelt routing zones 89. The five-point seatbelt routing zone 87 can be a single zone or separate zones for each portion or segment of the five-point seatbelt 85. In the example shown, the five-point seatbelt routing zone 87 includes a first portion that extends vertically from the neck and clavicles of the child occupant 56 to the waist of the child occupant 56 and a second portion that extends horizontally along the waist of the child occupant 56 to opposite sides of the child occupant 56.

Figure 15:
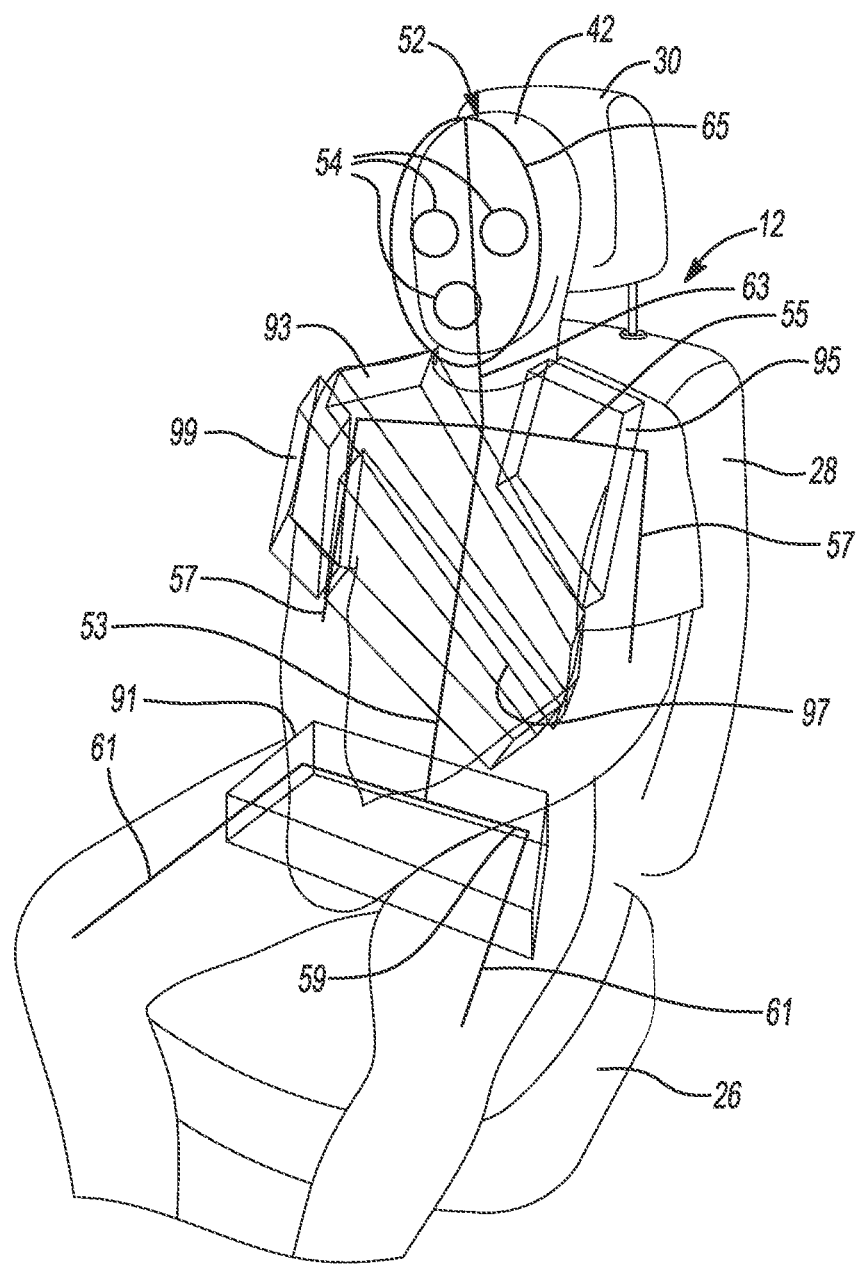
FIG. 15 is a perspective view similar to that shown in FIG. 1 except that the example seatbelt routing zones have depth.
Figure 21:
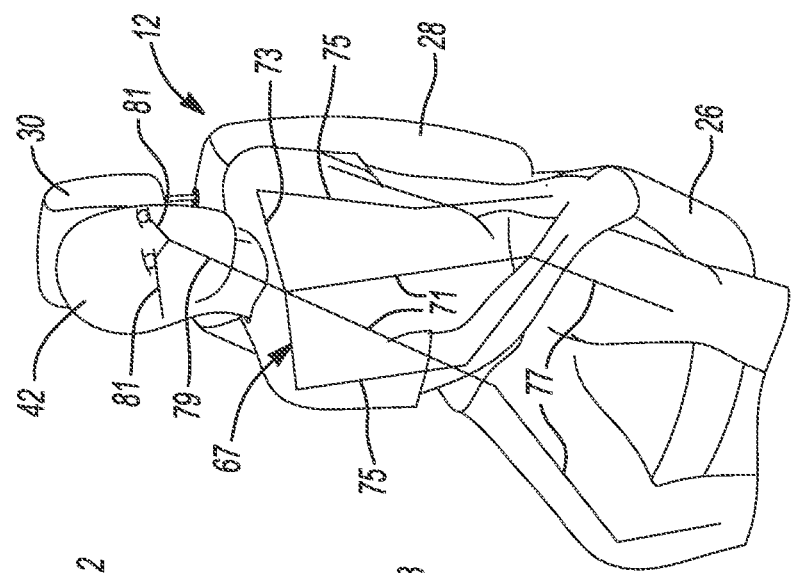
Figure 20:
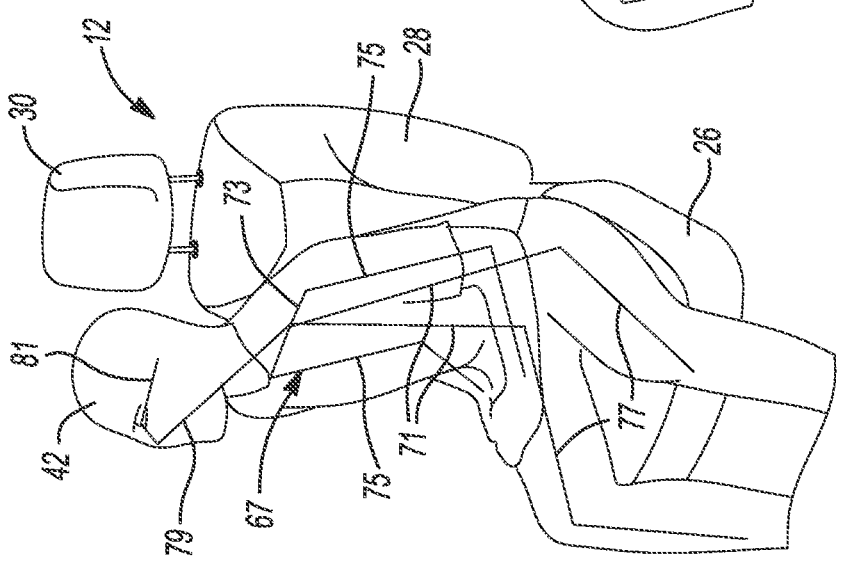
Figure 19:
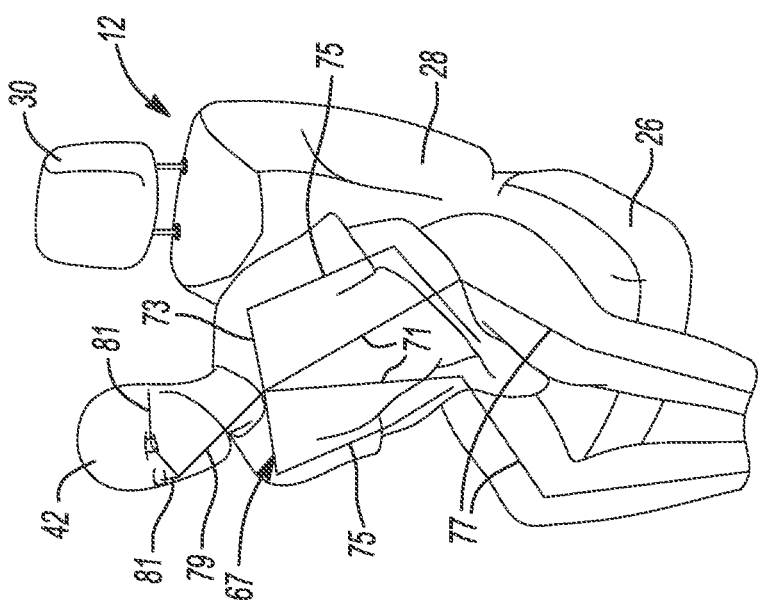

Instead of or in addition to generating two-dimensional seatbelt routing zones as shown in FIGS. 1, 2, and 14, or the seatbelt routing zone module 66 may generate three-dimensional seatbelt routing zones such as those shown in FIG. 15. The seatbelt routing zone module 66 may generate the three-dimensional seatbelt routing zones when the in-cabin sensor 20 includes a three-dimensional camera. While the two-dimensional seatbelt routing zones lie within a plane that is parallel to the corresponding surface of the occupant's body, the three-dimensional seatbelt routing zones have a depth that extends perpendicular to the corresponding surface of the occupant's body. The three-dimensional seatbelt routing zones shown in FIG. 15 include a proper lap belt zone 91, a proper shoulder belt zone 93, an incorrect side of head zone 95, an under arm zone 97, and an outside arm zone 99.

The seatbelt routing zone module 66 repeatedly generates the seatbelt routing zones and, in doing so, adjusts the locations and shape of the seatbelt routing zones based on the ever-changing posture and location of the occupant as indicated by the landmarks. The seatbelt routing zone module 66 may accomplish this by maintaining a predetermined dimensional relationship between the seatbelt routing zones and the landmarks. Thus, the seatbelt routing zone module 66 moves seatbelt routing zones with the landmarks as the occupant moves in the vehicle seat 12. FIGS. 5 through 13 and FIGS. 16 through 27 illustrate how the landmark module 64 and the seatbelt routing zone module 66 may adjust the location, shape, and/or orientation of the landmarks and the seatbelt routing zones as the occupant 42 moves in the vehicle seat 12. In addition, the landmark module 64 and the seatbelt routing zone module 66 may translate the landmarks and the seatbelt routing zones with the occupant if the occupant translates in the vehicle seat 12 from side to side, fore-aft, or up-down (such as when the occupant is raised up in a child restraint seat or when the position of the vehicle seat 12 is changed). Likewise, the landmark module 64 and the seatbelt routing zone module 66 may rotate the landmarks and seatbelt routing zones with the occupant if the occupant rotates in the vehicle seat 12, such as by leaning, or by the vehicle seat 12 being rotated, such as when the seat back 28 or the seat bottom 26 is moved to a different angle.

Figure 9:
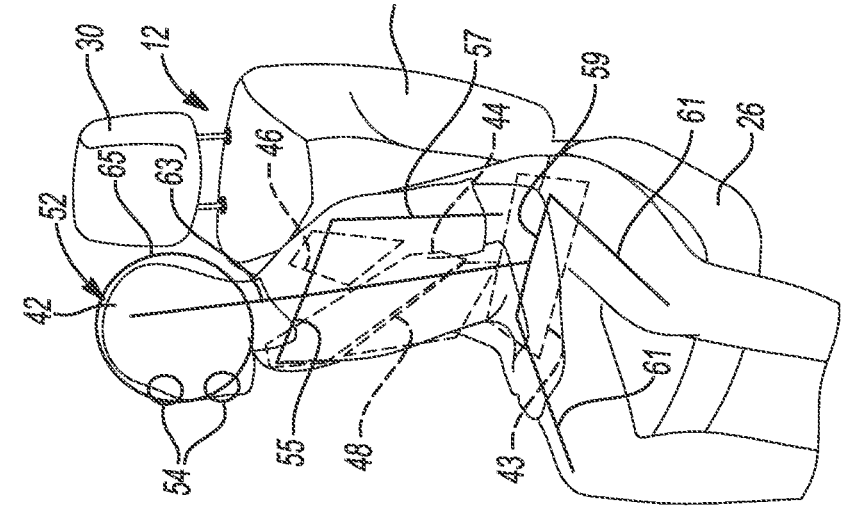
Figure 8:
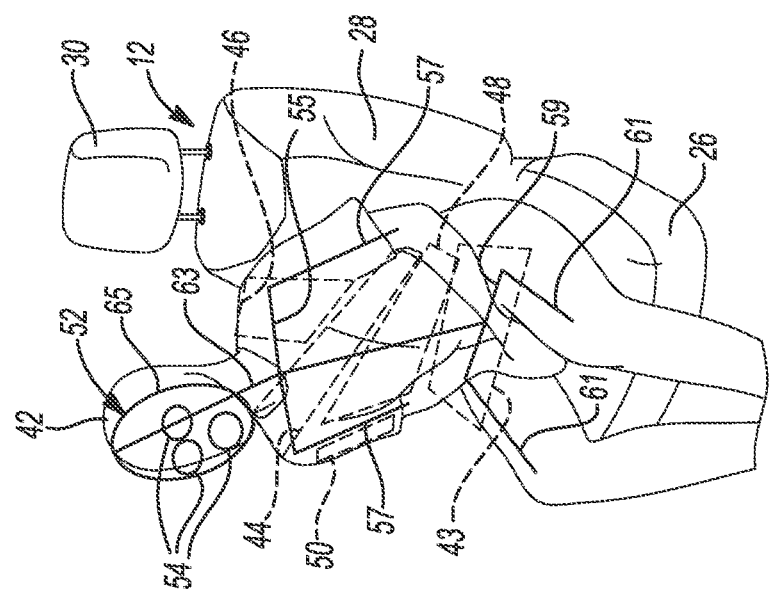

In some cases, the seatbelt routing zone module 66 may decide whether or not to generate a seatbelt routing zone based on the posture of the occupant as indicated by the landmarks. For example, when the occupant 42 is twisted toward its right side as shown in FIG. 9, the upper arm of the occupant 42 is not visible in the image generated by the in-cabin sensor 20 due to the occupant's posture and the angle of the in-cabin sensor 20. As a result, the seatbelt routing zone module 66 may not generate the outside arm zone 50. The seatbelt routing zone module 66 also may not generate the outside arm zone 50 if the occupant's upper arm is extending away from the right side of the occupant's torso.

With continued reference to FIG. 4, at 88, the seatbelt routing classification module 68 determines whether the three-point seatbelt 14 or the five-point seatbelt 85 is in one or more improper seatbelt routing zones. The improper seatbelt routing zones include the incorrect side of head zone 46, the under arm zone 48, the outside arm zone 50, the improper belt routing zones 62, and the improper five-point seatbelt routing zone 89. The seatbelt routing classification module 68 determines whether the three-point seatbelt 14 is in the incorrect side of head zone 46, the under arm zone 48, or the outside arm zone 50 when there is no child restraint seat present in the vehicle seat 12. The seatbelt routing classification module 68 determines whether the three-point seatbelt 14 is in the incorrect side of head zone 46, the under arm zone 48, the outside arm zone 50, or improper belt routing zones 62 when a child restraint seat without a five-point seatbelt (e.g., the booster seat 58) is present in the vehicle seat 12. The seatbelt routing classification module 68 determines whether the five-point seatbelt 85 is in the improper five-point seatbelt routing zone 89 when the child restraint seat 83 with the five-point seatbelt 85 is present in the vehicle seat 12. If the three-point seatbelt 14 or the five-point seatbelt 85 is in one or more improper seatbelt routing zones, the method continues at 90. Otherwise, the method returns to 72. In various implementations, if the shoulder belt portion 36 of the three-point seatbelt 14 is not in any of the proper or improper seatbelt routing zones, the seatbelt routing classification module 68 determines that the shoulder belt portion 36 is improperly routed (e.g., routed behind the occupant's back and not visible to the in-cabin sensor 20), and the method continues at 90.

Instead of or in addition to determining whether the three-point seatbelt 14 or the five-point seatbelt 85 is in one or more improper seatbelt routing zones, at 88, the seatbelt routing classification module 68 may determine whether the three-point seatbelt 14 or the five-point seatbelt 85 is in one or more proper seatbelt routing zones. The proper seatbelt routing zones include the proper lap belt zone 43, the proper shoulder belt zone 44, the proper belt routing zones 60, and the proper five-point seatbelt routing zone 87. The seatbelt routing classification module 68 may determine whether the three-point seatbelt 14 is the proper lap belt zone 43 or the proper shoulder belt zone 44 when a child restraint seat without a five-point seatbelt is present in the vehicle seat 12. The seatbelt routing classification module 68 may determine whether the three-point seatbelt 14 is in the proper lap belt zone 43, the proper shoulder belt zone 44, or the proper belt routing zones 60 when a child restraint seat without a five-point seatbelt is present in the vehicle seat 12. The seatbelt routing classification module 68 may determine whether the five-point seatbelt 85 is in the proper five-point seatbelt routing zone 87 when the child restraint seat 83 with the five-point seatbelt 85 is present in the vehicle seat 12. If the three-point seatbelt 14 or the five-point seatbelt 85 is in the proper seatbelt routing zones, the method returns to 72. Otherwise, the method continues at 90. In various implementations, the method may not determine whether the three-point seatbelt 14 is in the proper lap belt routing zone 43 or the proper belt routing zones 60, as these belt routing zones may be obscured by objects or clothing on or held by an occupant or by an abdominal region of an obese occupant.

In addition, the method may determine the probability of the three-point seatbelt 14 or the five-point seatbelt 85 being in a proper seatbelt routing zone and/or an improper seatbelt routing zone based on the amount of the seatbelt 14 or the seatbelt 85 disposed in each zone. For example, the seatbelt routing classification module 68 may determine that the highest probability zone is the zone in which the greatest amount of the seatbelt 14 or 85 is disposed, and select the highest probability zone as the zone that the seatbelt 14 or 85 occupies. This may be accomplished by counting the number of pixels that the seatbelt 14 or 85 occupies in an image for each zone, or part of a zone, in a region where adjacent zones are present. The zone or portion of a zone with the most occupied pixels may be selected as the zone through which the seatbelt 14 or 85 routes. This approach may be done for all zones or selected zones. In addition, a time-based approach may be used to select zones while the seatbelt 14 or 85 is visible, and it may be assumed that the seatbelt 14 or 85 remains in that zone if it is partially obscured but a portion of it can be seen in the zone without it being seen elsewhere in other zones.

With continued reference to FIG. 4, at 90, the seatbelt routing classification module 68 controls the user interface device 24 to generate a message indicating that the three-point seatbelt 14 or the five-point seatbelt 85 is not being properly worn. The message may also indicate how the three-point seatbelt 14 or the five-point seatbelt 85 is not being properly worn and/or instruct the occupant in the vehicle seat 12 to properly wear the three-point seatbelt 14 or the five-point seatbelt 85. For example, if the lap belt portion 34 is in the proper belt routing zone 60 while the shoulder belt portion 36 is in one or more of the incorrect side of head zone 46, the under arm zone 48, or the outside arm zone 50, the message may indicate that only the shoulder belt portion 36 is being improperly worn and/or indicate the shoulder belt routing classification. In another example, if the lap belt portion 34 is in the improper belt routing zones 62 while the shoulder belt portion 36 is in the proper shoulder belt zone 44, the message may indicate that only the lap belt portion 34 is being improperly worn.

In addition, at 90, the seatbelt routing classification module 68 may instruct other modules within the vehicle control module 22 to take one or more remedial actions. For example, the seatbelt routing classification module 68 may instruct a speed control module to limit the vehicle speed and/or stop the vehicle. In another example, the seatbelt routing classification module 68 may instruct an engine control module to stop an engine of the vehicle and/or disable starting the engine. In another example, the seatbelt routing classification module 68 may instruct a transmission control module to prevent shifting a transmission of the vehicle out of park. In another example, the seatbelt routing classification module 68 may generate a wireless signal to notify a vehicle fleet home office of the improper seatbelt usage. The method ends at 92.

Figure 28:
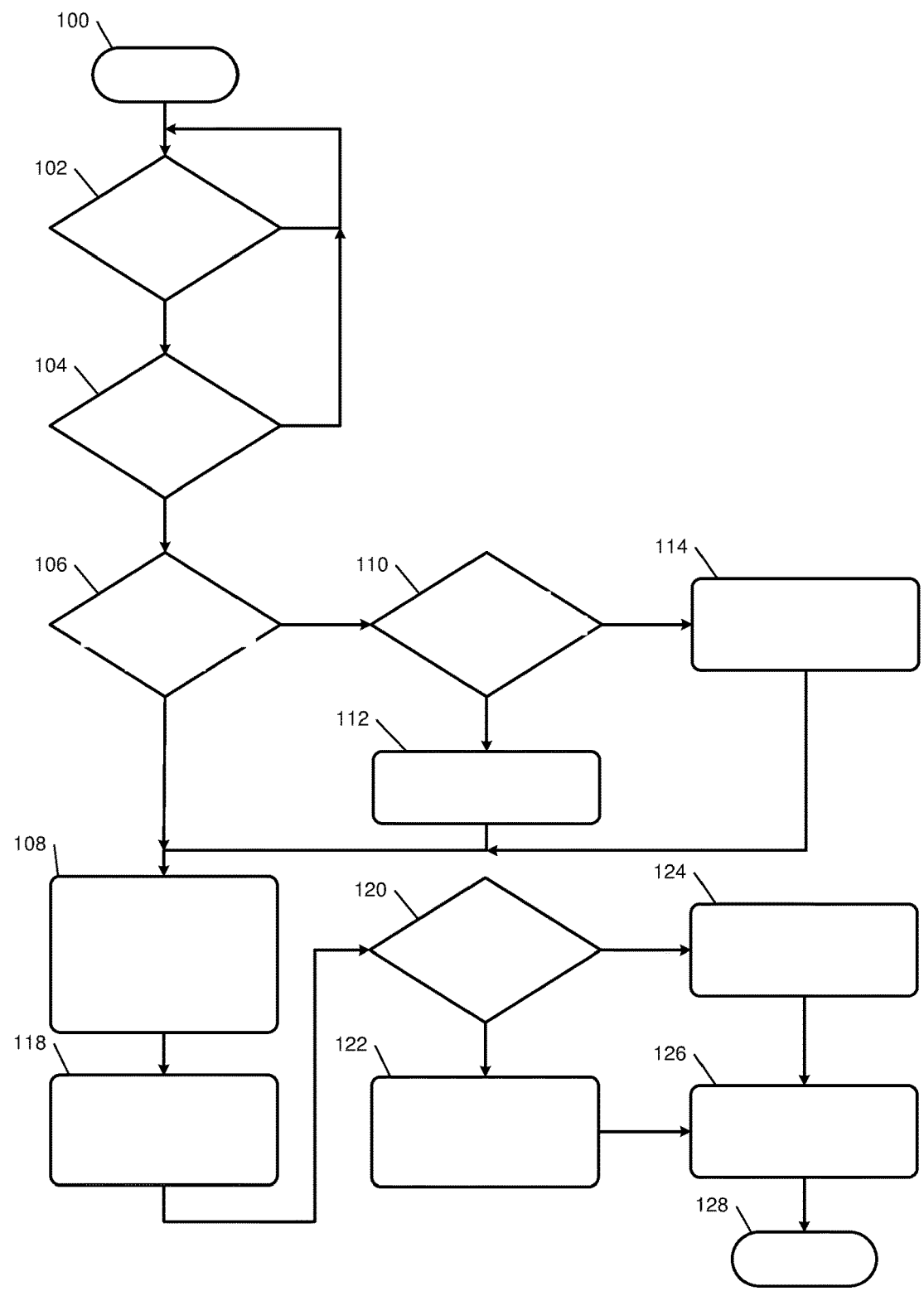
FIG. 28 is a flowchart illustrating another example seatbelt routing assessment method according to the present disclosure In the drawings, reference numbers may be reused to identify similar and/or identical elements.

Referring now to FIG. 28, another example method of assessing seatbelt routing begins at 100. Various aspects of the method of FIG. 4 may be incorporated in the method of FIG. 28 and vice versa. At 102, the seatbelt routing classification module 68 determines whether seatbelt routing assessment is active. The seatbelt routing classification module 68 may activate seatbelt routing assessment when a vehicle door (not shown) is opened, indicating that a passenger entered the vehicle, and/or when a vehicle ignition switch (not shown) is adjusted to an ON or RUN position. For an autonomous vehicle, the seatbelt routing classification module 68 may activate seatbelt routing assessment when a start ride button has been pressed and/or when a start ride signal has been given. The seatbelt routing classification module 68 may activate seatbelt routing assessment when the vehicle door is opened for a second time, indicating that at least one passenger entered or possibly exited the vehicle, and/or when the vehicle ignition switch is adjusted to an OFF position. The seatbelt routing classification module 68 may activate seatbelt routing assessment continually during a ride or periodically during a ride, such as by pulsing it on and off for periodic checks or turning it on when a change in state is detected by a sensor such as the seatbelt buckle sensor 18, the occupant detection sensor 16, the in-cabin sensor 20, or a seatbelt payout sensor. If the seatbelt routing assessment is active, the method continues at 104. Otherwise, the method remains at 102.

At 104, the seatbelt routing classification module 68 determines whether a seatbelt is buckled. For example, if the child restraint seat 83 is in the vehicle seat 12, the seatbelt routing classification module 68 determines whether the five-point seatbelt 85 is buckled. The seatbelt routing classification module 68 may make this determination based on the image from the in-cabin sensor 20. In another example, if the booster seat 58 is in the vehicle seat 12 or if no child restraint seat is in the vehicle seat 12, the seatbelt routing classification module 68 determines whether the three-point seatbelt 14 is buckled. The seatbelt routing classification module 68 may make this determination based on the input from the seatbelt buckle sensor 18 and/or the image from the in-cabin sensor 20. If the seatbelt is buckled, the method continues at 106. Otherwise, the method returns to 102.

At 106, the seatbelt routing classification module 68 determines whether the child restraint seat 83 with the five-point seatbelt 85 is present in the vehicle seat 12. The seatbelt routing classification module 68 may make this determination based on the image from the in-cabin sensor 20. If the child restraint seat 83 is present in the vehicle seat 12, the method continues at 108. Otherwise, the method continues at 110.

At 110, the seatbelt routing classification module 68 determines whether the seatbelt is in front of an occupant in the vehicle seat 12 at the time of buckling (i.e., when the seatbelt is buckled). The seatbelt routing classification module 68 may make this determination based on the image from the in-cabin sensor 20 and/or the output of the seatbelt buckle sensor 18. If the seatbelt is in front of the occupant at the time of buckling, the method continues at 112. Otherwise, the method continues at 114. At 112, the seatbelt routing classification module 68 determines that the lap belt portion 34 of the seatbelt 14 is worn. At 114, the seatbelt routing classification module 68 determines that the lap belt portion 34 of the seatbelt 14 is not worn since it is nearly impossible to wear the lap belt portion 34 if the seatbelt 14 is buckled before the occupant sits on the vehicle seat 12 or if the seatbelt 14 is buckled behind the occupant and is not visible at buckling.

At 108, the seatbelt routing classification module 68 selects which seatbelt routing zone to generate based on whether a child restraint seat is present in the vehicle seat 12 and, if so, whether the child restraint seat 83 has a five-point seatbelt. For example, the seatbelt routing classification module 68 may generate the proper lap belt zone 43, the proper shoulder belt zone 44, the incorrect side of head zone 46, the under arm zone 48, and the outside arm zone 50 of FIG. 1 when an occupant is in the vehicle seat 12 without a child restraint seat. In another example, the seatbelt routing classification module 68 may generate the proper belt routing zones 43, 60, the improper belt routing zones 62, the proper shoulder belt zone 44, the incorrect side of head zone 46, the under arm zone 48, and the outside arm zone 50 of FIG. 2 when a occupant is in the booster seat 58 on the vehicle seat 12. In another example, the seatbelt routing classification module 68 may generate the proper and improper five-point seatbelt routing zones 87 and 89 of FIG. 14 when an occupant is in the child restraint seat 83 on the vehicle seat 12. In yet another example, the seatbelt routing classification module 68 may generate proper and improper seatbelt routing zones that correspond to the seat belt routing path around a child when a lateral child bed restraint is detected.

At 118, the seatbelt routing classification module 68 determines the amount of the seatbelt, or a portion thereof (e.g., the lap belt portion 34, the shoulder belt portion 36, the five-point seatbelt 85), that is present within each seatbelt routing zone. The seatbelt routing classification module 68 may make this determination based on the image from the in-cabin sensor 20. In one example, the seatbelt routing classification module 68 determines the area of the seatbelt disposed within each seatbelt routing zone based on a number of pixels corresponding to the seatbelt within each seatbelt routing zone and a predetermined relationship between pixel count of the visible seatbelt and the pixel count of the routing zone area. This predetermined relationship could involve a percentage of the overall pixels in a routing zone area that contain the detected seatbelt webbing. In another example, the seatbelt routing classification module 68 determines the total length of the portion(s) of a longitudinal centerline of the seatbelts that is disposed within each seatbelt routing zone.

At 120, the seatbelt routing classification module 68 determines whether the amount of the seatbelt, or the portion thereof, disposed within any one of the seatbelt routing zones is greater than a threshold. The threshold may have a unique and/or predetermined amount for each seatbelt routing zone. If the seatbelt amount disposed in any one of the seatbelt routing zones is greater than the threshold, the method continues at 122. Otherwise, the method continues at 124. At 124, the seatbelt routing classification module 68 determines that the shoulder belt portion 36 of the seatbelt 14 is not worn or that the five-point seatbelt 85 is not worn. The seatbelt routing classification module 68 determines that the shoulder belt portion 36 of the seatbelt 14 is not worn at 124 if the booster seat 58 is in the vehicle seat 12 or if no child restraint seat is in the vehicle seat 12. The seatbelt routing classification module 68 determines that the five-point seatbelt 85 is not worn at 124 if the child restraint seat 83 with the five-point seatbelt 85 is present in the vehicle seat 12.

At 122, the seatbelt routing classification module 68 classifies the seatbelt routing based on the seatbelt routing zone(s) with the highest amount(s) of the seatbelt disposed therein. The seatbelt routing classification module 68 may determine that the seatbelt corresponds to one of seatbelt routing zones when the amount of the seatbelt disposed within the one seatbelt routing zone is greater than the amount of the seatbelt disposed in any of the other seatbelt routing zones. The amount of the seatbelt disposed within a routing zone may be based on the percentage of the overall routing zone area that it occupies or the amount of area within a zone that it occupies. The seatbelt routing classification module 68 may classify the routing of the shoulder belt portion 36 independent of classifying the routing of the lap belt portion 34 and vice versa.

When classifying the seatbelt routing, the seatbelt routing classification module 68 may apply weighting values to the seatbelt amounts disposed in the seatbelt routing zones before determining which seatbelt routing zone has the greatest amount. For example, when the seatbelt 14 is routed as shown in FIG. 11, the amount of the shoulder belt portion 36 disposed in each of the under arm zone 48, and the outside arm zone 50 may be greater than the threshold(s) and greater than the amount of the shoulder belt portion 36 disposed in each of the proper shoulder belt zone 44 and the incorrect side of head zone 46, in which the amounts of the shoulder belt portion 36 disposed may be less than the threshold(s). In addition, the amount of the shoulder belt portion 36 disposed in the under arm zone 48 may be greater than the amount of the shoulder belt portion 36 disposed the outside arm zone 50. Thus, without applying weighting values, the seatbelt routing classification module 68 may erroneously conclude that the shoulder belt portion 36 is routed under the arm of the occupant when in fact the shoulder belt portion 36 is routed outside of the occupant's arm. To avoid such errors, the seatbelt routing classification module 68 may apply a greater weighting value to the outside arm zone 50 than the weighting value, if any, applied to the under arm zone 48. Notably, if the seatbelt routing classification module 68 did not adjust the locations and shape of the seatbelt routing zones based on the posture of the occupant 42, the seatbelt routing classification module 68 may not determine that the shoulder belt portion 36 is being improperly worn in FIG. 11. For example, the seatbelt routing classification module 68 may determine that the shoulder belt portion 36 is not worn at all since the shoulder belt amount disposed in each shoulder belt zone, including the under arm zone 48, for an otherwise vertically-oriented occupant may be less than the threshold. In another example, if the occupant 52 was leaning in the opposite direction than shown in FIG. 11 and the seatbelt 14 was routed in the outside arm zone 50, the seatbelt routing classification module 68 may determine that the shoulder belt portion 36 is properly routed if posture-based correction of the routing zones was not applied, as the outside arm zone 50 for an occupant leaning in the opposite direction than shown in FIG. 11 is approximately where the proper shoulder belt zone 44 is for an occupant with a vertically aligned torso.

In another example, when the seatbelt 14 is routed as shown in FIG. 12, the seatbelt routing classification module 68 determines that the shoulder belt portion 36 is properly routed. The seatbelt routing classification module 68 may make this determination without applying weighting values since the shoulder belt amount disposed in the proper shoulder belt zone 44 is greater than the shoulder belt amount disposed in any of the other shoulder belt zones (i.e., the incorrect side of head zone 46, the under arm zone 48, and the outside arm zone 50). Alternatively, by applying weighting values, this determination may be made with more margin. Notably, if the seatbelt routing classification module 68 did not adjust the locations and shape of the seatbelt routing zones based on the posture of the occupant 42, the seatbelt routing classification module 68 may not determine that the shoulder belt portion 36 is properly worn in FIG. 12. For example, the seatbelt routing classification module 68 may determine that the shoulder belt portion 36 is routed under or outside of the occupant's arm.

In another example, when the seatbelt 14 is routed as shown in FIG. 13, the seatbelt routing classification module 68 determines that the shoulder belt portion 36 is routed on the incorrect side of the occupant's head. The seatbelt routing classification module 68 may make this determination without applying weighting values since the shoulder belt amount disposed in the incorrect side of head zone 46 is greater than the shoulder belt amount disposed in any of the other shoulder belt zones. Alternatively, by applying weighting values, this determination may be made with more margin. In another example, when the seatbelt 14 is routed as shown in any one of FIGS. 11 through 13, the seatbelt routing classification module 68 determines that the lap belt portion 34 is properly routed since the amount of the lap belt portion 34 disposed in the proper lap belt zone 43 is greater than the threshold and greater than the lap belt amount disposed in any other lap belt routing zones (none exist in this example). Notably, if the seatbelt routing classification module 68 did not adjust the locations and shape of the seatbelt routing zones based on the posture of the occupant 42, the seatbelt routing classification module 68 may not determine that the shoulder belt portion 36 is being improperly worn in FIG. 13. For example, the seatbelt routing classification module 68 may determine that the shoulder belt portion 36 is not worn at all since the shoulder belt amount disposed in each shoulder belt zone, including the incorrect side of head zone 46, may be less than the threshold.

With continued reference to FIG. 28, at 126, the seatbelt routing classification module 68 controls the user interface device 24 to generate a message indicating that the three-point seatbelt 14 or the five-point seatbelt 85 is not being properly worn. The message may also indicate how the three-point seatbelt 14 or the five-point seatbelt 85 is not being properly worn and/or instruct the occupant in the vehicle seat 12 to properly wear the three-point seatbelt 14 or the five-point seatbelt 85. For example, if the lap belt portion 34 is in the proper lap belt routing zone 43 while the shoulder belt portion 36 is in one or more of the incorrect side of head zone 46, the under arm zone 48, or the outside arm zone 50, the message may indicate that only the shoulder belt portion 36 is being improperly worn and/or indicate the shoulder belt routing classification. In another example, if the lap belt portion 34 is in the improper belt routing zones 62 while the shoulder belt portion 36 is in the proper shoulder belt zone 44, the message may indicate that only the lap belt portion 34 is being improperly worn.

In addition, at 126, the seatbelt routing classification module 68 may instruct other modules within the vehicle control module 22 to take one or more remedial actions. For example, the seatbelt routing classification module 68 may instruct a speed control module to limit the vehicle speed and/or stop the vehicle. In another example, the seatbelt routing classification module 68 may instruct an engine control module to stop an engine of the vehicle and/or disable starting the engine. In another example, the seatbelt routing classification module 68 may instruct a transmission control module to prevent shifting a transmission of the vehicle out of park. In another example, the seatbelt routing classification module 68 may generate a wireless signal to notify a vehicle fleet home office of the improper seatbelt usage. The seatbelt routing classification module 68 may also control the user interface device 24 to generate a message indicating whether or not the three-point seatbelt 14 or the five-point seatbelt 85 is being properly worn and/or indicating the way in which the seatbelt 14 or 85 is improperly routed. The method ends at 128.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the f phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects.

The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
   an in-cabin sensor operable to generate an image of an occupant in a vehicle seat;
   a seatbelt routing zone module configured to generate a seatbelt routing zone based on at least one of a size of the occupant in the image and a shape of the occupant;
   a seatbelt routing classification module configured to determine whether a seatbelt is routed properly around the occupant based on whether the seatbelt is at least partially within the seatbelt routing zone; and
   a landmark module configured to generate a landmark representing a geometry of the occupant in the image and a posture of the occupant in the image, wherein the seatbelt routing zone module configured to generate the seatbelt routing zone based on the landmark,
   wherein the landmark includes at least one of a stick figure representation of the occupant and a shell representation of the occupant.

2. The system of claim 1 wherein:
   the seatbelt routing zone includes a proper seatbelt routing zone and an improper seatbelt routing zone; and
   the seatbelt routing classification module is configured to determine whether the seatbelt is properly routed based on an amount of the seatbelt disposed within the proper and improper seatbelt routing zones.

3. The system of claim 2 wherein:
   the proper seatbelt routing zone includes at least one of a proper shoulder belt zone and a proper lap belt routing zone; and
   the improper seatbelt routing zone includes at least one of an incorrect side of head zone, an under arm zone, and an outside arm zone.

4. The system of claim 3 wherein:
   the proper shoulder belt zone extends diagonally across a torso of the occupant from a first side of the occupant adjacent to a seatbelt buckle of the vehicle seat to a first shoulder of the occupant on a second side of the occupant opposite of the first side;
   the proper lap belt zone extends horizontally over the lap of an occupant from the first side of the occupant to the second side of the occupant;
   the incorrect side of head zone extends vertically from the proper shoulder belt zone to a second shoulder of the occupant on the first side of the occupant;
   the under arm zone extends diagonally across the torso of the occupant from the first side of the occupant to an underarm area of the occupant on the second side of the occupant; and
   the outside arm zone extends vertically along a humerus of the occupant on the second side of the occupant.

5. The system of claim 2 wherein the seatbelt routing classification module is configured to determine that an actual routing of the seatbelt corresponds to one of the proper and improper seatbelt routing zones when the amount of the seatbelt disposed within the one of the proper and improper seatbelt routing zones is greater than at least one of:
   the amount of the seatbelt disposed within any of the other proper and improper seatbelt routing zones; and
   a predetermined amount.

6. The system of claim 2 wherein when a booster seat is present in the vehicle seat, the proper seatbelt routing zone is disposed under hooked wings on the booster seat and the improper seatbelt routing zone is disposed above the hooked wings on the booster seat.

7. The system of claim 2 wherein:
the proper seatbelt routing zone includes a five-point seatbelt zone when a child restraint seat with a five-point seatbelt is present within the vehicle seat; and
the five-point seatbelt zone includes a first portion that extends vertically from a neck and clavicles of the occupant to a waist of the occupant and a second portion that extends horizontally along the waist of the occupant to opposite sides of the occupant.

8. The system of claim 1 wherein the seatbelt routing zone module is configured to determine a size of the seatbelt routing zone, a shape of the seatbelt routing zone, and a location of the seatbelt routing zone based on at least one of the size of the occupant and the shape of the occupant.

9. The system of claim 8 wherein the seatbelt routing zone module is configured to adjust the location of the seatbelt routing zone and the shape of the seatbelt routing zone based on a posture of the occupant in the image.

10. The system of claim 1 wherein the seatbelt routing zone module is configured to determine a size of the seatbelt routing zone, a shape of the seatbelt routing zone, and a location of the seatbelt routing zone based on at least one of the size of the occupant and the shape of the occupant as indicated by the landmark.

11. The system of claim 10 wherein the seatbelt routing zone module is configured to adjust the location of the seatbelt routing zone and the shape of the seatbelt routing zone based on the posture of the occupant as indicated by the landmark.

12. The system of claim 1 further comprising a user interface device, wherein the seatbelt routing zone module controls the user interface device to instruct the occupant to sit vertically before the routing of the seatbelt is assessed.

13. The system of claim 1 wherein the seatbelt routing zone module is configured to generate the seatbelt routing zone based on whether a child restraint seat is present in the vehicle seat.

14. The system of claim 1 wherein the seatbelt routing zone module is configured to adjust a location of the seatbelt routing zone based on a location of the occupant in the image.

15. The system of claim 1 wherein the seatbelt routing zone is three-dimensional.

16. The system of claim 1 wherein the seatbelt routing classification module is configured to determine that the seatbelt is improperly routed if the seatbelt is not in front of the occupant when the seatbelt is secured to a seatbelt buckle of the vehicle seat.

17. A system comprising:
an in-cabin sensor operable to generate an image of an occupant in a vehicle seat;
a landmark module configured to generate a landmark based on the image, wherein the landmark includes at least one of a stick figure representation of the occupant and a shell representation of the occupant;
a seatbelt routing zone module configured to:
generate a seatbelt routing zone based on the landmark;
determine a size of the seatbelt routing zone, a shape of the seatbelt routing zone, a location of the seatbelt routing zone based on at least one of a size of the occupant and a shape of the occupant as indicated by the landmark; and
adjust the location of the seatbelt routing zone and the shape of the seatbelt routing zone based on a posture of the occupant as indicated by the landmark; and
a seatbelt routing classification module configured to determine whether a seatbelt is routed properly around the occupant based on whether the seatbelt is at least partially within the seatbelt routing zone.

18. The system of claim 17 wherein:
the seatbelt routing zone includes a proper seatbelt routing zone and an improper seatbelt routing zone; and
the seatbelt routing classification module is configured to:
determine an amount of the seatbelt disposed within the proper and improper seatbelt routing zones; and
determine that an actual routing of the seatbelt corresponds to one of the proper and improper seatbelt routing zones when the amount of the seatbelt disposed within the one of the proper and improper seatbelt routing zones is greater than at least one of:
the amount of the seatbelt disposed within any of the other proper and improper seatbelt routing zones; and
a predetermined amount.

19. A system comprising:
an in-cabin sensor operable to generate an image of an occupant in a vehicle seat;
a seatbelt routing zone module configured to generate a seatbelt routing zone based on at least one of a size of the occupant in the image and a shape of the occupant; and
a seatbelt routing classification module configured to determine whether a seatbelt is routed properly around the occupant based on whether the seatbelt is at least partially within the seatbelt routing zone,
wherein the seatbelt routing zone module is configured to generate the seatbelt routing zone based on whether a child restraint seat is present in the vehicle seat.

20. The system of claim 19 wherein the seatbelt routing zone module is configured to determine a size of the seatbelt routing zone, a shape of the seatbelt routing zone, and a location of the seatbelt routing zone based on at least one of the size of the occupant and the shape of the occupant.

* * * * *